US012346227B2

(12) United States Patent
Pandit et al.

(10) Patent No.: US 12,346,227 B2
(45) Date of Patent: *Jul. 1, 2025

(54) CROSS-PLATFORM REPLICATION

(71) Applicant: NetApp, Inc., San Jose, CA (US)

(72) Inventors: Atul Ramesh Pandit, Los Gatos, CA (US); Vijay M. Deshmukh, Fremont, CA (US); Michael Lee Federwisch, San Jose, CA (US); Ling Zheng, Saratoga, CA (US); Kiyoshi James Komatsu, San Mateo, CA (US); Rachita Kothiyal, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,660

(22) Filed: Feb. 29, 2024

(65) Prior Publication Data
US 2024/0202083 A1 Jun. 20, 2024

Related U.S. Application Data

(63) Continuation of application No. 17/828,900, filed on May 31, 2022, now Pat. No. 11,921,597, which is a
(Continued)

(51) Int. Cl.
*G06F 11/00* (2006.01)
*G06F 11/20* (2006.01)
(Continued)

(52) U.S. Cl.
CPC ...... *G06F 11/2069* (2013.01); *G06F 11/2071* (2013.01); *G06F 11/2092* (2013.01);
(Continued)

(58) Field of Classification Search
CPC ............. G06F 11/2069; G06F 11/2071; G06F 11/2082; G06F 11/0727; G06F 11/2053;
(Continued)

(56) References Cited

U.S. PATENT DOCUMENTS 6,578,121 B1  6/2003 Schutzman
6,665,705 B1  12/2003 Daniels-Barnes et al.
(Continued)

FOREIGN PATENT DOCUMENTS

CN   101090330 A   12/2007
CN   103081435 A   5/2013
(Continued)

OTHER PUBLICATIONS

"Data Replication Technology: What it is & how does it work?", URL: https://stonefly.com/blog/data-replication-technology-what-it-is-how-does-it-work/, retrieved Apr. 19, 2024, 7 pages.
(Continued)

*Primary Examiner* — Joseph D Manoskey
(74) *Attorney, Agent, or Firm* — Cooper Legal Group, LLC

(57) ABSTRACT

One or more techniques and/or computing devices are provided for cross-platform replication. For example, a replication relationship may be established between a first storage endpoint and a second storage endpoint, where at least one of the storage endpoints, such as the first storage endpoint, lacks or has incompatible functionality to perform and manage replication because the storage endpoints have different storage platforms that store data differently, use different control operations and interfaces, etc. Accordingly, replication destination workflow, replication source workflow, and/or a proxy representing the first storage endpoint may be implemented at the second storage endpoint comprising the replication functionality. In this way, replication, such as snapshot replication, may be implemented between the storage endpoints by the second storage endpoint using the replication destination workflow, the replication source workflow, and/or the proxy that either locally executes tasks
(Continued)

or routes tasks to the first storage endpoint such as for data access.

20 Claims, 18 Drawing Sheets

Related U.S. Application Data continuation of application No. 16/805,885, filed on Mar. 2, 2020, now Pat. No. 11,347,605, which is a continuation of application No. 15/995,607, filed on Jun. 1, 2018, now Pat. No. 10,585,768, which is a continuation of application No. 15/142,126, filed on Apr. 29, 2016, now Pat. No. 9,990,260.

(51) Int. Cl.
H04L 67/1095 (2022.01)
H04L 67/1097 (2022.01)

(52) U.S. Cl.
CPC ...... H04L 67/1095 (2013.01); H04L 67/1097 (2013.01); G06F 2201/805 (2013.01)

(58) Field of Classification Search
CPC ........... G06F 11/2056; G06F 2201/805; H04L 67/1095; H04L 67/1097
See application file for complete search history.

(56) References Cited

U.S. PATENT DOCUMENTS

| | | | |
|---|---|---|---|
| 7,774,391 | B1 | 8/2010 | Le et al. |
| 9,110,898 | B1* | 8/2015 | Chamness ........... G06F 11/3409 |
| 9,990,260 | B2 | 6/2018 | Pandit et al. |
| 10,585,768 | B2 | 3/2020 | Pandit et al. |
| 11,347,605 | B2 | 5/2022 | Pandit et al. |
| 11,921,597 | B2 | 3/2024 | Pandit et al. |
| 2003/0140210 | A1 | 7/2003 | Testardi |
| 2007/0282979 | A1 | 12/2007 | Tuel |
| 2009/0262724 | A1 | 10/2009 | Suzuki et al. |
| 2011/0055621 | A1 | 3/2011 | Mandagere et al. |
| 2011/0125999 | A1* | 5/2011 | Cilfone ............... G06F 11/1464 711/E12.001 |
| 2012/0054850 | A1 | 3/2012 | Bhardwaj et al. |
| 2012/0166394 | A1 | 6/2012 | Kim et al. |
| 2012/0278382 | A1 | 11/2012 | Faith et al. |
| 2013/0304866 | A1* | 11/2013 | Wu ..................... H04L 67/1097 709/219 |
| 2014/0181027 | A1 | 6/2014 | Whitehead et al. |
| 2015/0026129 | A1 | 1/2015 | Brewer et al. |
| 2015/0169242 | A1* | 6/2015 | Lo ........................ G06F 3/0665 711/162 |
| 2015/0269043 | A1 | 9/2015 | Wilson et al. |
| 2015/0334110 | A1 | 11/2015 | Bishop et al. |
| 2016/0004721 | A1 | 1/2016 | Iyer et al. |
| 2016/0034481 | A1 | 2/2016 | Kumarasamy et al. |
| 2016/0070495 | A1 | 3/2016 | Periyagaram et al. |
| 2016/0085462 | A1 | 3/2016 | Buzzard et al. |
| 2016/0224249 | A1 | 8/2016 | Desai |
| 2017/0093975 | A1 | 3/2017 | Raghunath et al. |
| 2017/0187819 | A1* | 6/2017 | Aizman ................. H04L 12/18 |
| 2017/0223117 | A1 | 8/2017 | Messerli et al. |
| 2017/0255401 | A1 | 9/2017 | Basham et al. |
| 2017/0286512 | A1* | 10/2017 | Zhang ................. G06F 11/2094 |
| 2019/0121709 | A1 | 4/2019 | Abouelwafa et al. |
| 2020/0034449 | A1 | 1/2020 | Gupta |
| 2020/0241787 | A1 | 7/2020 | Zhang et al. |
| 2022/0292005 | A1 | 9/2022 | Pandit et al. |

FOREIGN PATENT DOCUMENTS

| | | |
|---|---|---|
| CN | 104376062 A | 2/2015 |
| WO | 2016060675 A1 | 4/2016 |

OTHER PUBLICATIONS

"Heterogeneous and Vendor Independent NAS Replication. It it Magic?", URL: https://datadobi.com/blog/heterogeneous-and-vendor-independent-nas-replication-is-it-magic/, retrieved Apr. 19, 2024, 2 pages.

"Heterogeneous replication", URL: https://infocenter.sybase.com/help/index.jsp?topic=/com.sybase.infocenter.dc36924.1510/html/rshetrep/BGBFFDGJ.htm, retrieved Apr. 19, 2024, 1 page.

"3.2 Heterogeneous Replication", URL: https://docs.oracle.com/en/database/oracle/oracle-database/21/heter/heterogeneous-replication.html#GUID-4460493F-1360-40DA-8209-969A4AB23DF1, retrieved Apr. 19, 2024, 3 pages.

"Reldata Heterogeneous Data Replication and Disaster Recovery", URL: https://www.datastorageconnection.com/doc/reldata-data-replication-disaster-recovery-0002, retrieved Apr. 19, 2024, 1 page.

"What is the state of the art on heterogeneous replication?", URL: https://typeset.io/questions/what-is-the-state-of-the-art-on-heterogeneous-replication-4w05fy35mb, retrieved Apr. 19, 2024, 5 pages.

Non-Final Office Action mailed on Jun. 1, 2023 for U.S. Appl. No. 17/828,900, filed May 31, 2022, 18 pages.

Notice of Allowance mailed on Oct. 31, 2023 for U.S. Appl. No. 17/828,900, filed May 31, 2022, 5 pages.

International Search Report and Written Opinion for Application No. PCT/US2017/030381 dated Jul. 28, 2017, 13 pages.

First CN Office Action cited in CN201780036961.X, mailed Jul. 21, 2021, 11 pages.

Second CN Office Action cited in CN201780036961.X, mailed Mar. 22, 2022, 7 pages.

EP Office Action cited in EP17723820.1, mailed Aug. 20, 2019, 4 pages.

* cited by examiner

CROSS-PLATFORM REPLICATION

RELATED APPLICATIONS

This application claims priority to and is a continuation of U.S. application Ser. No. 17/828,900, filed on May 31, 2022, now allowed, titled "CROSS-PLATFORM REPLICATION," which claims priority to and is a continuation of U.S. Pat. No. 11,347,605, filed on Mar. 2, 2020 titled "CROSS-PLATFORM REPLICATION," which claims priority to and is a continuation of U.S. Pat. No. 10,585,768, filed on Jun. 1, 2018, now allowed, titled "CROSS-PLATFORM REPLICATION," which claims priority to and is a continuation of U.S. Pat. No. 9,990,260, filed on Apr. 29, 2016 and titled "CROSS-PLATFORM REPLICATION," which are incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data can be provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage object (e.g., a file, a LUN, a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object. Semi-synchronous replication may be achieved where an acknowledgment back to a client for a write request is based upon local implementation upon the first storage object, but is not dependent upon remote implementation upon the second storage object.

A storage environment may comprise storage controllers with different storage platforms. For example, the storage environment may have different versions or models of storage controllers (e.g., a storage controller with a disk based storage platform, a flash array storage platform, a volume based storage platform, a consistency group of files and/or LUNs storage platform, a distributed storage platform such as cloud storage, etc.) that store data differently, use different extent sizes, have different compression characteristics, support different types of storage operations and syntax, have different data and control interfaces, provide different user interfaces for administrators, etc. Unfortunately, cross-platform storage controllers with different storage platforms may be unable to establish and facilitate data replication and other functionality with one another. Thus, data replication and protection may be unavailable for cross-platform storage controllers.

DETAILED DESCRIPTION

Figure 1:
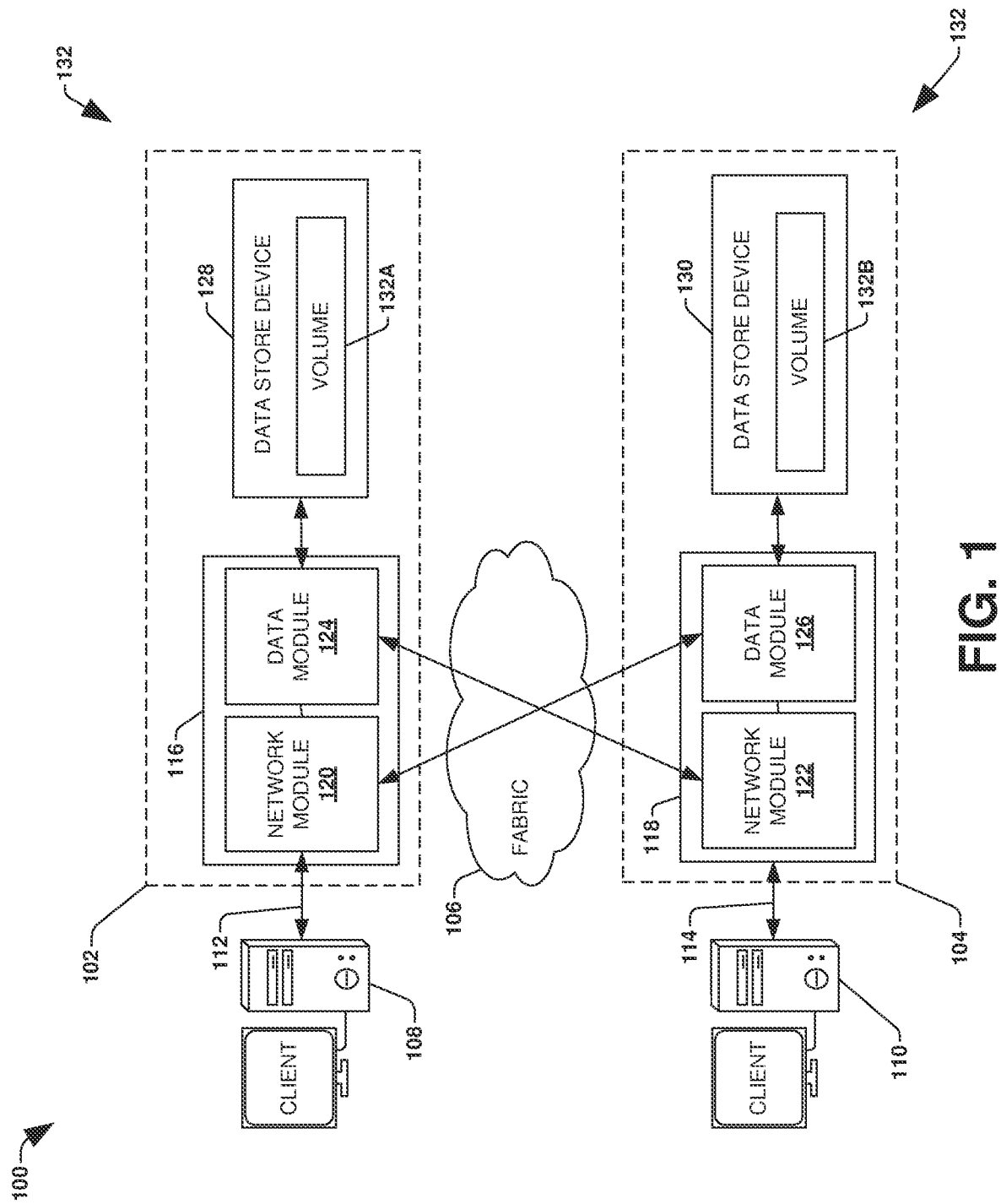
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for cross-platform replication are provided herein. For example, a first storage endpoint (e.g., a source storage controller hosting source storage) and a second storage endpoint (e.g., a destination storage controller hosting destination storage into which data from the source storage is to be replicated) may have different storage platforms (e.g., a disk based storage platform, a flash array storage platform, a volume based storage platform, a consistency group of files and/or LUNs storage platform, a distributed storage platform such as cloud storage, etc.) that do not natively support replication between one another.

Accordingly, as provided herein, a replication relationship may be established and managed using replication source workflow and replication destination workflow (e.g., control operations, a get volume information operation, a create snapshot operation, a create stream operation, a manage stream operation, a set tag operation, a determine differences between two snapshots operation, a data transfer management operation, etc.) executing on a single device (e.g., executing on the first storage endpoint, the second storage endpoint, or a separate storage server). A proxy is used to represent a storage endpoint (e.g., represent storage hosted by the storage endpoint, such as a destination volume) at which the replication source workflow and the replication destination workflow are not executing because the storage endpoint may not natively support replication facilitated by the other storage endpoint. For example, if the replication source workflow and the replication destination workflow are executing at the first storage endpoint, then a proxy, representing the second storage endpoint (e.g., representing second storage of the second storage endpoint), may be hosted at the first storage endpoint. In an example, the first storage endpoint, but not the second storage endpoint, may comprise functionality to perform replication such as snapshot replication, and thus the replication source workflow, the replication destination workflow, and the proxy are hosted at the first storage endpoint.

When the proxy is hosted at the first storage endpoint, certain destination workflow tasks associated with snapshot replication may be executed upon the proxy (e.g., executed against a physical or virtual proxy volume used to represent destination storage such as the second storage of the second storage endpoint) because the proxy is compatible with snapshot replication (e.g., control operations, such as a create stream operation that does not require data from a file system of the second storage, may be locally executed upon the proxy). Other destination workflow tasks associated with snapshot replication may be implemented upon the proxy and routed by the proxy to the second storage (e.g., a file system access operation, which may use actual data within the second storage, may be routed to the second storage for retrieval of such data). In this way, a replication operation may be performed to replicate data from the first storage of the first storage endpoint to the second storage of the second storage endpoint (e.g., a baseline transfer of a volume or consistency group of files and/or logical unit numbers (LUNs), an incremental transfer of a delta between a current snapshot of the first storage and a last snapshot of the first storage used to transfer data to the second storage, etc.). Because the replication source workflow, the replication destination workflow, and the proxy are hosted at the first storage endpoint (e.g., the first storage endpoint is capable of managing data transfer, control operations, the replication relationship, a state machine, etc.), the second storage endpoint may be a lightweight endpoint that does not need functionality to fully support all aspects of snapshot replication (e.g., the second storage endpoint may have send and/or receive functionality for actual data replication, while other aspects of snapshot replication are handled by the proxy).

To provide cross-platform replication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the node 118 within the data storage system 104 (e.g., which may be remote from the data storage system 102). The node 118 can forward the data to the data storage device 130 using the data module 126, thereby accessing volume 132B associated with the data storage device 130.

It may be appreciated that cross-platform replication may be implemented within the clustered network environment 100. In an example, the node 116 and the node 118 may have different storage platforms, such as where merely one of the nodes, such as node 116, has full capabilities of performing and managing snapshot replication between the node 116 and the node 118. Accordingly, a replication destination workflow, a source replication work, and a proxy, representing the node 118, may be implemented at the node 116 for performing snapshot replication operations. It may be appreciated that cross-platform replication may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
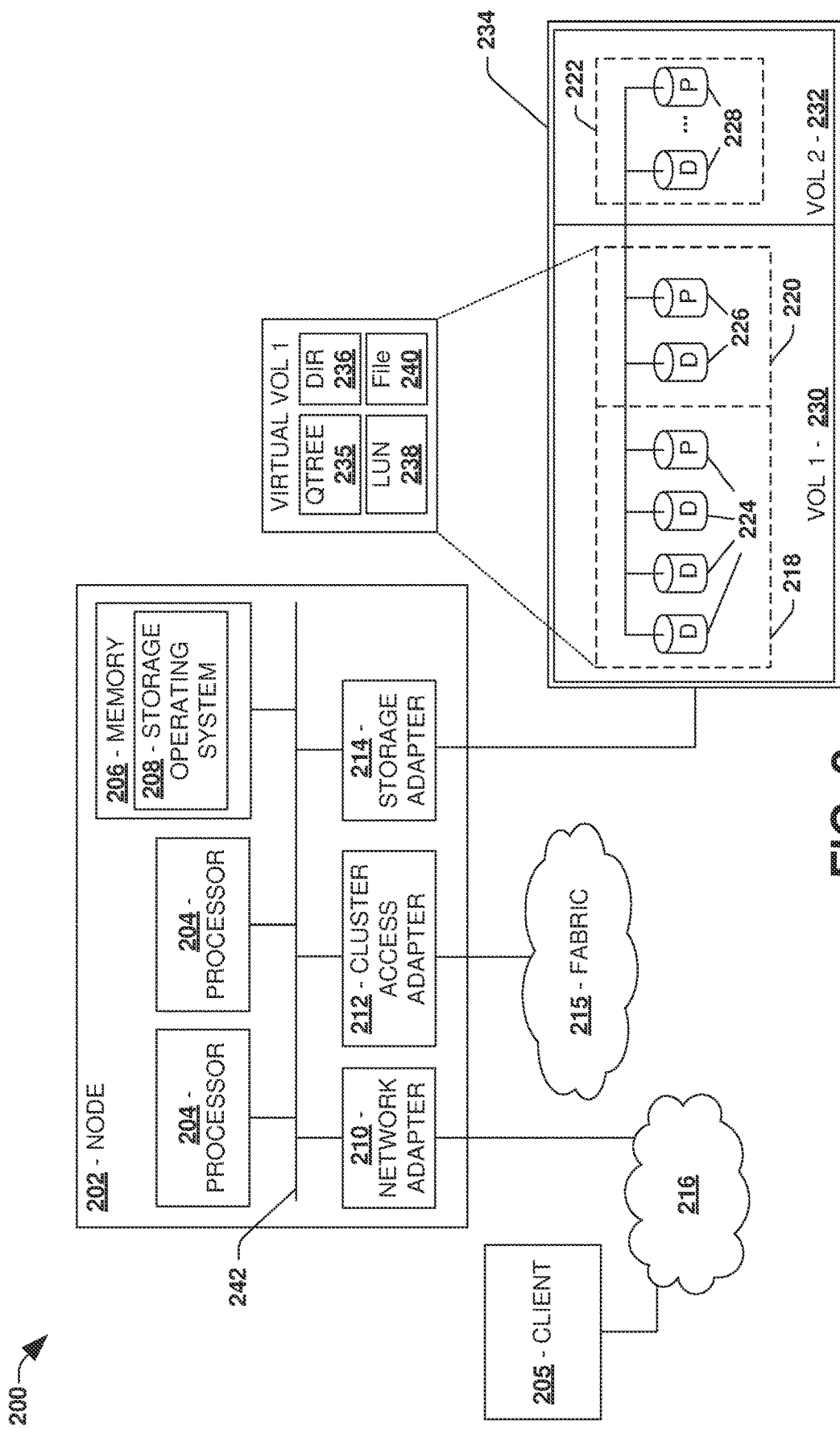
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that cross-platform replication may be implemented for the data storage system 200. In an example, the node 202 may comprise functionality for performing and managing snapshot replication. A second node, not illustrated, may have a different storage platform than the node 202, and thus may not have full capabilities of performing and managing snapshot replication. Accordingly, a replication destination workflow, a source replication work, and a proxy, representing the second node, may be implemented at the node 202 for performing snapshot replication operations. It may be appreciated that inline deduplication may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
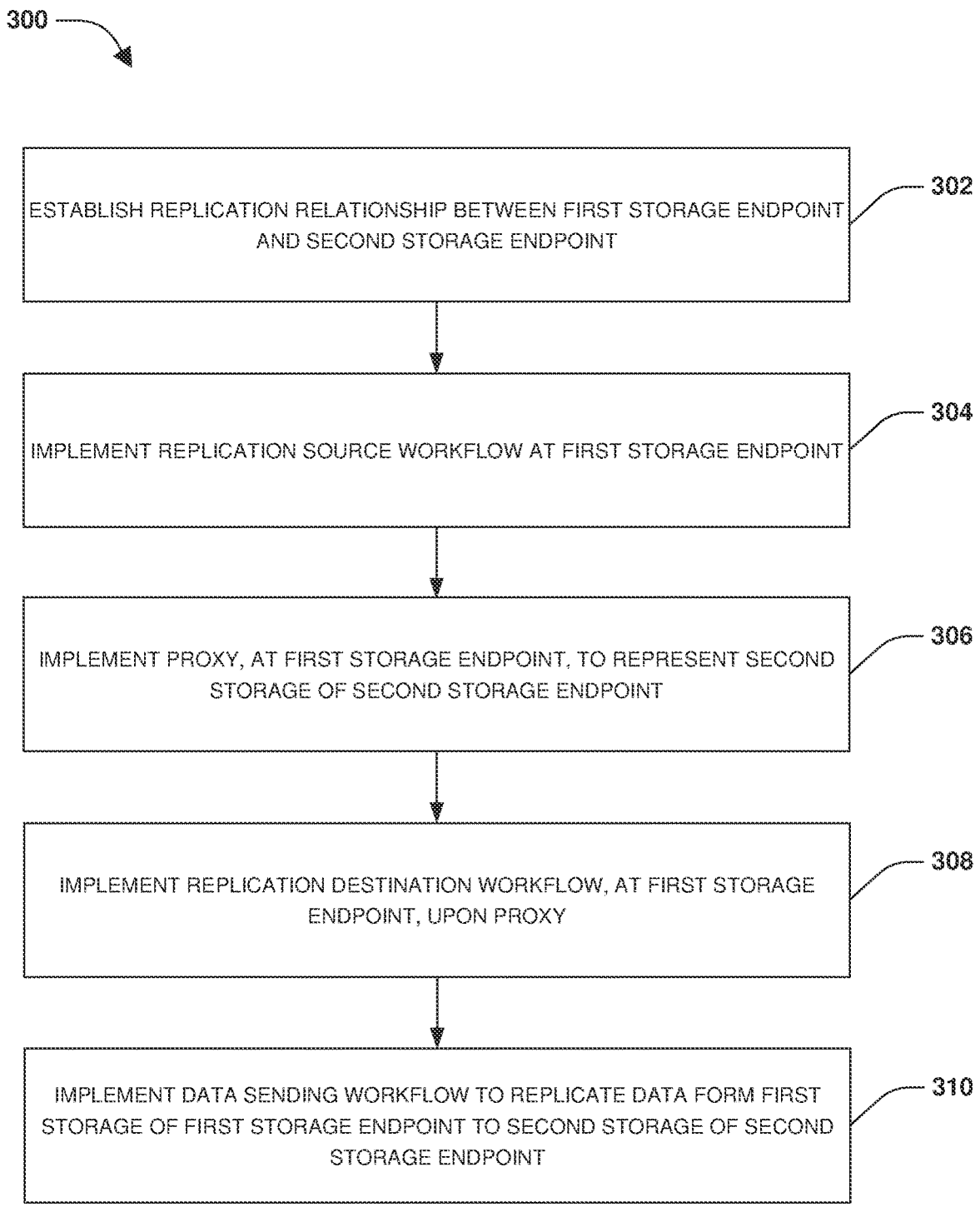
FIG. 3 is a flow chart illustrating an exemplary method of cross-platform replication.

One embodiment of cross-platform replication is illustrated by an exemplary method 300 of FIG. 3. At 302, a replication relationship may be established between a first storage endpoint (e.g., a first storage controller hosting first storage that is used as a replication source for replication) and a second storage endpoint (e.g., a second storage controller hosting second storage that is used as a replication destination for the replication). In an example, the replication relationship may correspond to snapshot replication, where a baseline transfer is performed using a baseline snapshot to transfer data for the first time from the first storage to the second storage and/or where incremental transfers are performed to transfer a delta (e.g., a difference in data, files, directories, a volume, etc.) of the first storage as captured by a latest snapshot of the first storage and a last snapshot of the first storage used to replicate data from the first storage to the second storage. It may be appreciated that any type of data transfer relationship may be established, such as a snapshot replication relationship, a data migration relationship, a synchronous replication relationship, an asynchronous replication relationship, a semi-synchronous replication relationship, etc.

The first storage endpoint and the second storage endpoint may be different storage platforms, such as a disk based storage platform, a flash array storage platform, a volume based storage platform, a consistency group of files and/or LUNs storage platform, a distributed storage platform such as cloud storage, etc., which may store data differently, use different extent sizes, have different compression characteristics, support different types of storage operations and syntax, have different data and control interfaces, provide different user interfaces for administrators, etc. In an example, the first storage endpoint may have a first storage platform that supports performing and managing replication, while the second storage endpoint may lack the ability to fully perform and manage replication (e.g., the second storage endpoint may comprise send and/or receive functionality, but not functionality to fully implement all control operations associated with replication in the same manner as the first storage platform). Accordingly, replication source workflow, replication destination workflow, and a proxy representing second storage of the second storage endpoint may be implemented at the first storage endpoint because the first storage endpoint is capable of performing and managing the replication.

At 304, the replication source workflow (e.g., management of control operations and/or data transfer operations usually performed by a source storage endpoint, such as the first storage endpoint) may be implemented at the first storage endpoint based upon the replication relationship to utilize the first storage, hosted by the first storage endpoint, as the replication source for replicating data to the second storage hosted by the second storage endpoint.

At 306, a proxy, representing the second storage of the second storage endpoint, may be implemented at the first storage endpoint. The proxy may be implemented at the first storage endpoint because the second storage endpoint may not comprise functionality capable of performing replication destination workflow. In an example, the first storage corresponds to a first volume that is natively compatible with the replication relationship due to the first storage platform being capable of performing and managing the replication, and the second storage corresponds to a second volume that is not natively compatible with the replication relationship due to the second storage platform not being capable of performing and managing the replication. Accordingly, first configuration data of the first volume may be recorded as a source volume, in the replication relationship, for replication. The proxy (e.g., a virtual proxy volume, a physical proxy volume, or other storage appearing to be natively compatible with the replication relationship) may be recorded as a destination volume, in the replication relationship, for replication. In this way, replication destination workflow may be implemented upon the proxy (e.g., because the proxy appears to be a destination volume that is natively compatible with the replication relationship), which may locally execute certain tasks of the replication destination workflow (e.g., control operations not natively supported by the second storage endpoint) or may route certain tasks to the second volume (e.g., file system access operations that relate to actual data stored within the second volume). At 308, the replication destination workflow is implemented, at the first storage endpoint, upon the proxy.

At 310, data sending workflow may be implemented to replicate data from the first storage of the first storage endpoint to the second storage of the second storage endpoint. For example, a difference between two snapshots of the first storage may be identified as delta data. The data sending workflow may replicate the delta data to the second storage endpoint to apply to the second storage. In this way, cross-platform replication may be implemented where not all storage endpoints natively support snapshot replication or other types of replication.

In an example, the first storage endpoint may use a first extent size type (e.g., a representation of a LUN may be in 4 kilobyte (KB) blocks) that is different than a second extent size type used by the second storage endpoint (e.g., a sequence of variable sized extents). Accordingly, the second storage endpoint may be instructed to maintain an extent bitmap file used to track extent sizes, of the first extent size type, of data replicated from the first storage endpoint to the second storage endpoint. In one example, start-offsets and lengths of extents being replicated to a first type of storage platform may be recorded within the extent bitmap file. In another example, a start-sector-number and length of extents being replicated to a second type of storage platform may be recorded within the extent bitmap file. Each sector can be represented as a bit, such that a start-sector-number is an offset into the extent bitmap file. A start of an extent can be represented as a 1 followed by some number of zeroes spanning a length of the extent. In this way, when data is restored back from the first storage endpoint to the second storage endpoint (e.g., responsive to determining that the first storage endpoint recovered from a failure where the second storage endpoint provided clients with access to replicated data), the second storage endpoint may be instructed to utilize the extent bitmap file to restore data back to the first storage endpoint with extent sizes having the first extent size, which may mitigate space inflation (e.g., a LUN composed of 3 extents of sizes s1, s2, and s3 should be restored back with the same extent I/O sizes of s1, s2, and s3).

In an example, the first storage endpoint may use a first compression scheme different than a second compression scheme used by the second storage endpoint (e.g., compression implemented at a per extent level, compression of 32 KB of data on 32 KB aligned boundaries, etc.). Compression savings may be preserved during replication such as over the wire or on disk at the second storage endpoint. The first storage endpoint and the second storage endpoint may negotiate whether a compression algorithm used by the first storage endpoint is understandable or known to the second storage endpoint. If the endpoints both understand the compression algorithm, then the first storage endpoint will send compressed data over the wire, otherwise the first storage endpoint will send uncompressed data over the wire. In an example, the second storage endpoint will either preserve compression of replicated data from the first storage endpoint or will decompress and re-compress the replicated data.

In an example, the first storage endpoint may be instructed to perform deduplication upon data that is to be replicated to the second storage endpoint. For example, the first storage endpoint may send names of the data to the second storage endpoint. If the second storage endpoint already comprises the data, then the first storage endpoint may refrain from sending the data. Otherwise, if the second storage endpoint does not already comprise the data, then the first storage endpoint may send the data to the second storage endpoint.

In an example, the second storage endpoint may be invoked to provide clients with access to replicated data in response to the first storage endpoint incurring a failure. In another example, the second storage endpoint may be capable of creating snapshots of the replicated data. In another example, user interfaces for the first storage endpoint and the second storage endpoint may be provided in a similar manner for similar client experiences when managing replication across storage platforms.

Figure 4A:
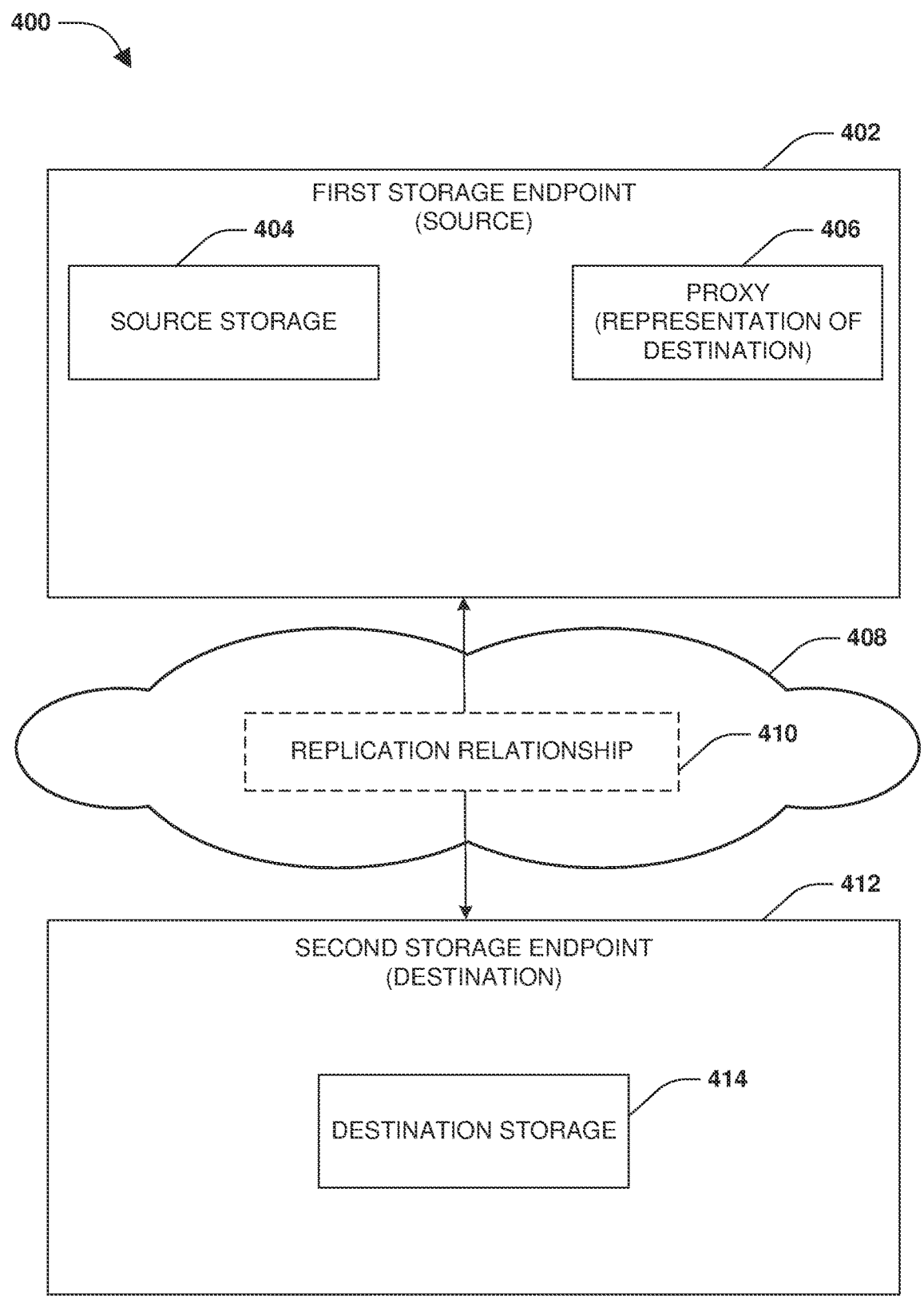
FIG. 4A is a component block diagram illustrating an exemplary computing device for cross-platform replication, where a proxy is implemented at a first storage endpoint.

FIGS. 4A-4D illustrate examples of a system 400 for cross-platform replication. FIG. 4A illustrates a first storage endpoint 402 having communication capabilities with a second storage endpoint 412 over a network 408. A replication relationship 410 may be established between the first storage endpoint 402 as a replication source and the second storage endpoint 412 as a replication destination. For example, the replication relationship 410 may specify that data of source storage 404 of the first storage endpoint 402 (e.g., a LUN, a file, a consistency group of LUNs or files, a volume, a directory, etc.) is to be replicated to destination storage 414 of the second storage endpoint 412, such as by performing baseline and/or incremental transfers using snapshots. In an example, the first storage endpoint 402 may have a first storage platform that can perform and/or manage snapshot replication. However, the second storage endpoint 412 may have a second storage platform that cannot fully perform and/or manage snapshot replication (e.g., in the same manner as the first storage platform). Accordingly, a proxy 406 may be implemented at the first storage endpoint 402 to represent the destination storage 414 of the second storage endpoint 412. For example, the proxy 406 may be a virtual or physical proxy volume that is compatible with replication functionality provided by the first storage endpoint 402, but is configured to appear to be destination storage of the replication.

Figure 4B:
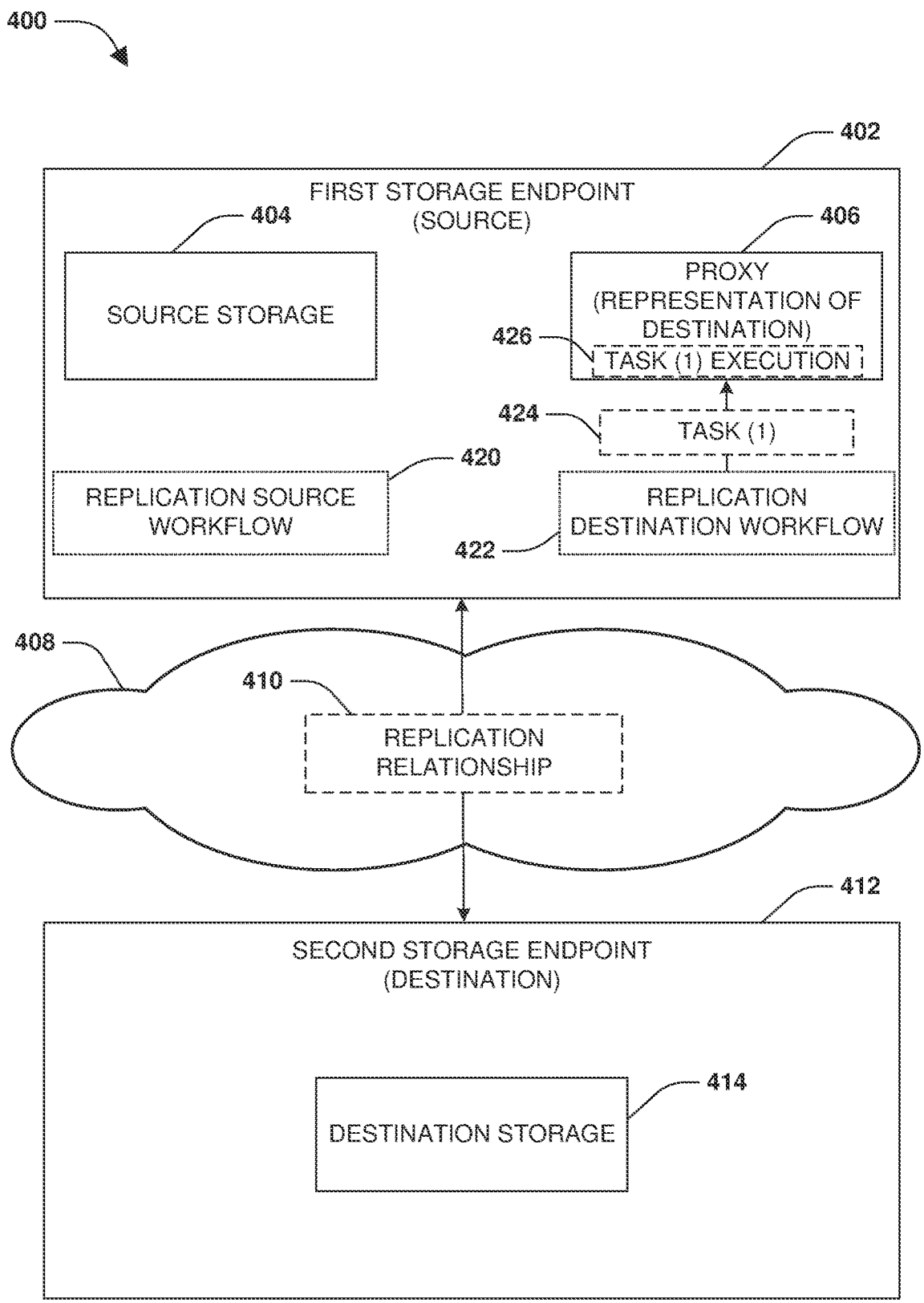
FIG. 4B is a component block diagram illustrating an exemplary computing device for cross-platform replication, where replication source workflow and replication destination workflow are implemented at a first storage endpoint.

FIG. 4B illustrates the first storage endpoint 402 implementing replication source workflow 420 to perform operations that the replication source is to execute in order to perform and/or manage replication. The first storage endpoint 402 may implement replication destination workflow 422 to perform operations that the replication destination is to execute in order to perform and/or manage replication (e.g., in place of the second storage endpoint 412 implementing the replication destination workflow 422 because the second storage endpoint 412 may not comprise functionality to adequately perform and/or manage replication with the first storage endpoint 402, thus allowing the second storage endpoint 412 to be a lightweight endpoint). In an example, the replication destination workflow 422 may execute 426 a first task 424, having a first task type, against the proxy 406 (e.g., a create stream task may be fully implemented by the proxy 406 without being routed to the second storage endpoint 412, management of a replication state machine, etc.). The first task type may correspond to control operations that can be locally executed by the proxy 406 without accessing data stored within the destination storage 414.

Figure 4C:
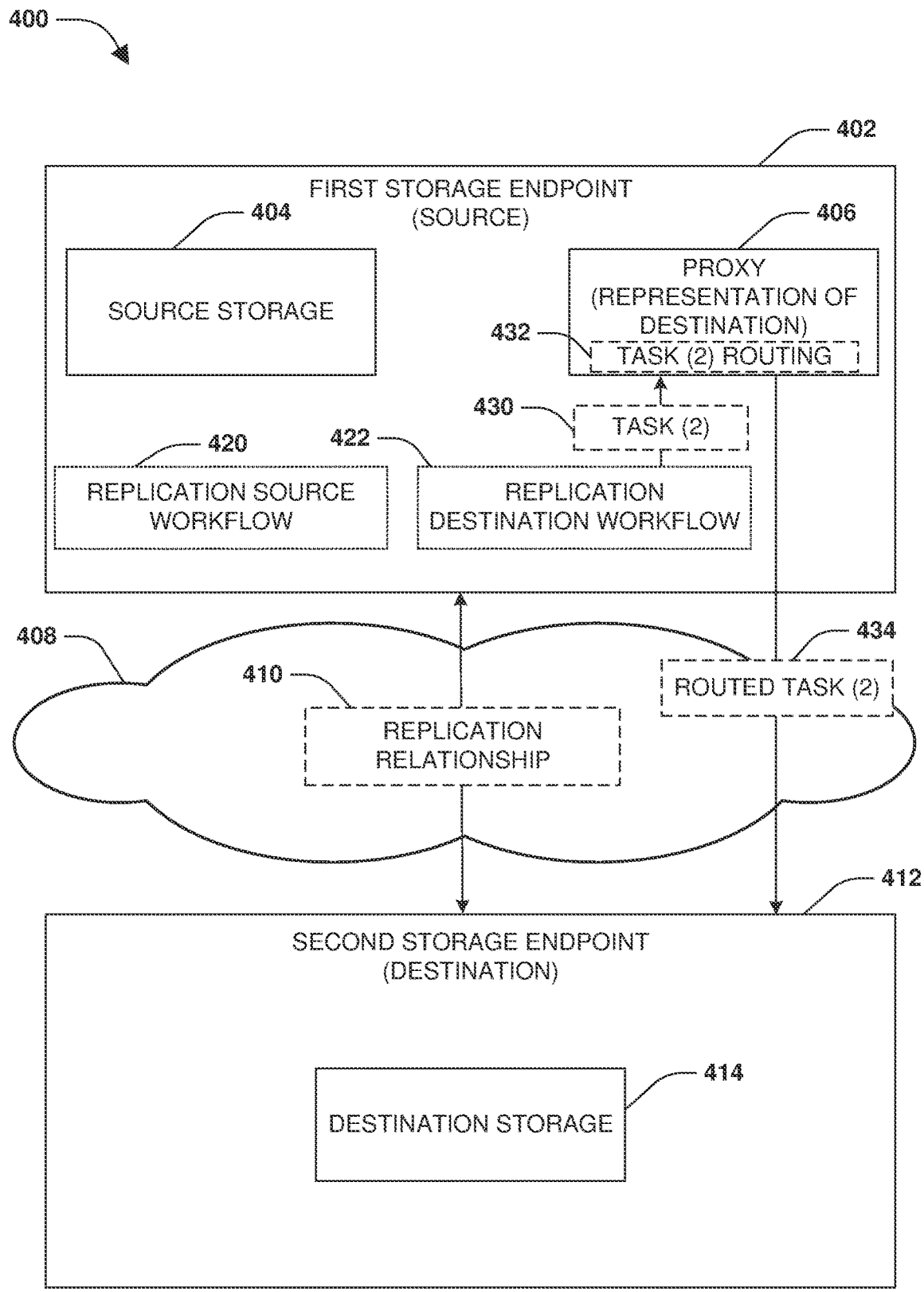
FIG. 4C is a component block diagram illustrating an exemplary computing device for cross-platform replication, where replication source workflow and replication destination workflow are implemented at a first storage endpoint.
Figure 4D:
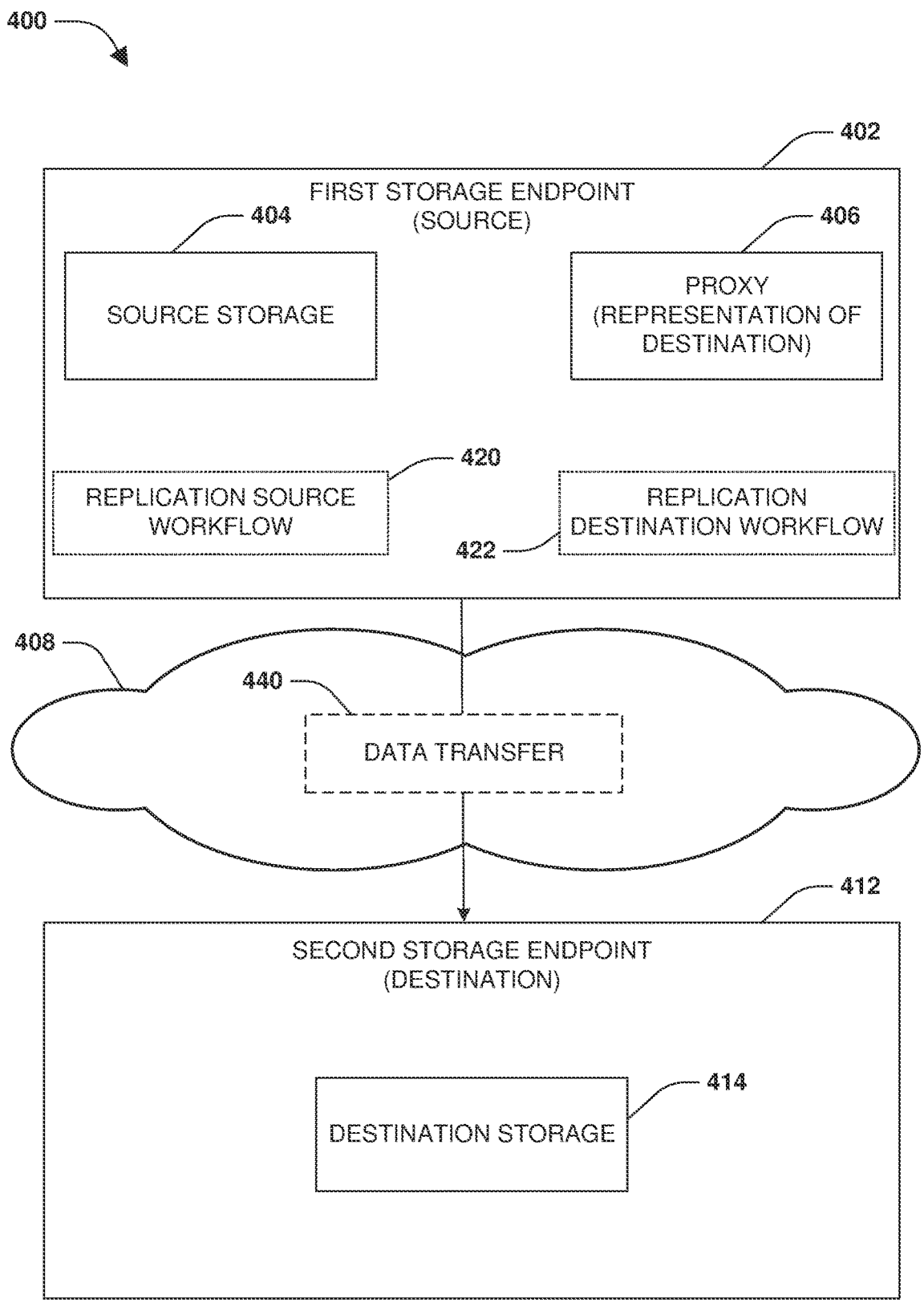
FIG. 4D is a component block diagram illustrating an exemplary computing device for cross-platform replication, where data transfer is performed between a first storage endpoint and a second storage endpoint.

FIG. 4C illustrates the replication destination workflow 422 implementing a second task 430 upon the proxy 406, which is routed 432 by the proxy 406 to the second storage endpoint 412 as a routed second task 434. The proxy 406 may route 432 the second task 430 because the second task 430 may correspond to data within the destination storage 414 (e.g., the second task 430 has a second task type that uses data within the destination storage 414). For example, the second task 430 may comprise a file system access operation. In this way, the proxy 406 either executes tasks or routes tasks to the second storage endpoint 412 for execution. FIG. 4D illustrates the first storage endpoint 402 performing a data transfer 440 from the source storage 404 to the destination storage 414. For example, the data transfer 440 may send a delta of the source storage 404 between a current snapshot of the source storage 404 and a last snapshot of the source storage 404 used for a last data transfer. In this way, a replication operation may be performed to replicate data of the source storage 404 to the destination storage 414.

Figure 5:
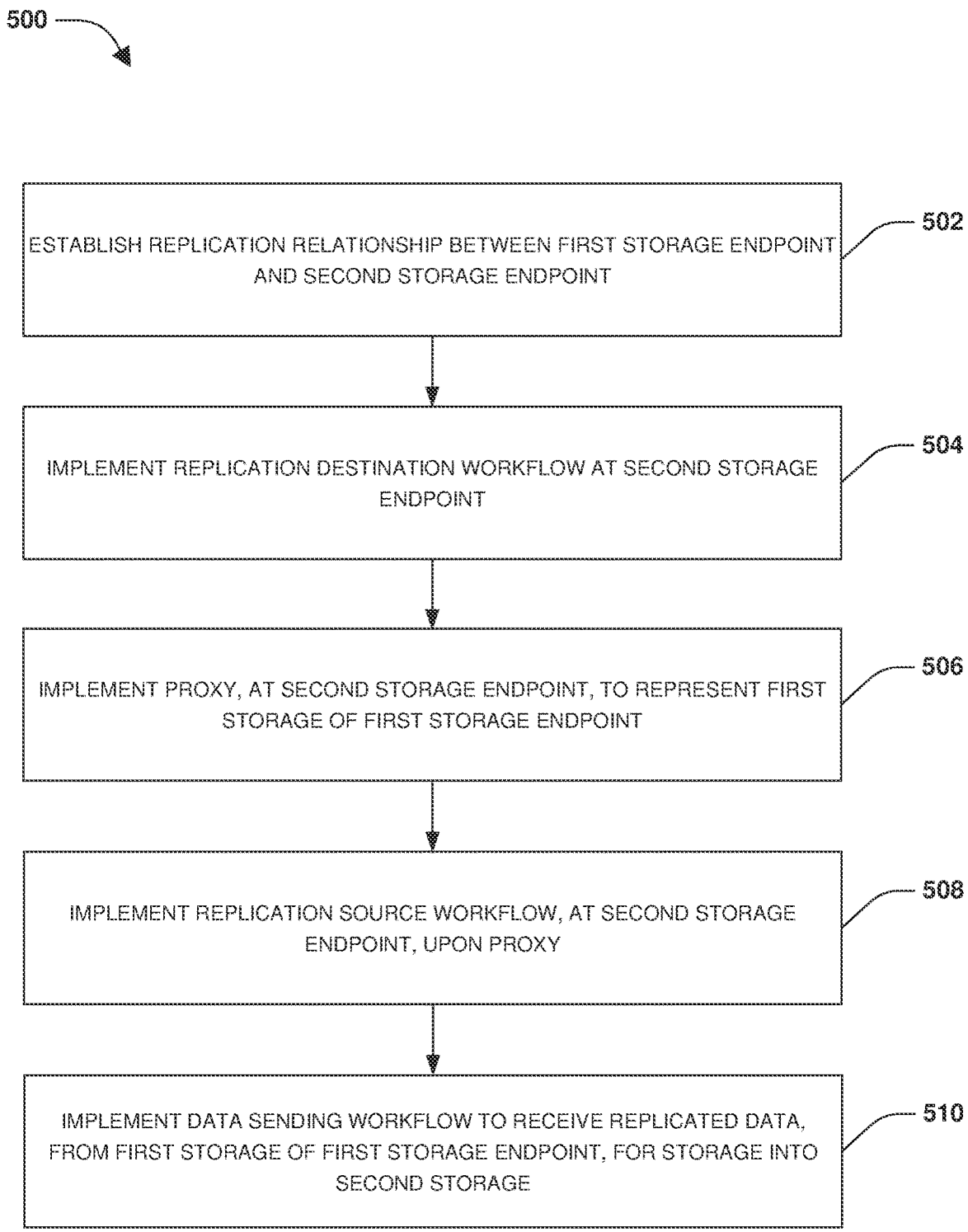
FIG. 5 is a flow chart illustrating an exemplary method of cross-platform replication.

One embodiment of cross-platform replication is illustrated by an exemplary method 500 of FIG. 5. At 502, a replication relationship may be established between a first storage endpoint (e.g., a first storage controller hosting first storage that is used as a replication source for replication) and a second storage endpoint (e.g., a second storage controller hosting second storage that is used as a replication destination for the replication).

The first storage endpoint and the second storage endpoint may be different storage platforms, such as a disk based storage platform, a flash array storage platform, a volume based storage platform, a consistency group of files and/or LUNs storage platform, a distributed storage platform such as cloud storage, etc., which may store data differently, use different extent sizes, have different compression characteristics, support different types of storage operations and syntax, have different data and control interfaces, provide different user interfaces for administrators, etc. In an example, the second storage endpoint may have a second storage platform that supports performing and managing replication, while the first storage endpoint may lack the ability to fully perform and manage replication (e.g., the first storage endpoint may comprise send and/or receive functionality, but not functionality to fully implement all control operations associated with replication in the same manner as the second storage platform). Accordingly, replication source workflow, replication destination workflow, and a proxy representing first storage of the first storage endpoint may be implemented at the second storage endpoint because the second storage endpoint is capable of performing and managing the replication.

At 504, a replication destination workflow (e.g., management of control operations and/or data transfer operations usually performed by a destination storage endpoint, such as the second storage endpoint) may be implemented at the second storage endpoint based upon the replication relationship to utilize second storage, hosted by the second storage endpoint, as a replication destination for storing replicated data from first storage of the first storage endpoint.

At 506, a proxy, representing the first storage of the first storage endpoint, may be implemented at the second storage endpoint. The proxy may be implemented at the second storage endpoint because the first storage endpoint may not comprise functionality capable of performing replication source workflow. In an example, the second storage corresponds to a second volume that is natively compatible with the replication relationship due to the second storage platform being capable of performing and managing the replication, and the first storage corresponds to a first volume that is not natively compatible with the replication relationship due to the first storage platform not being capable of performing and managing the replication. Accordingly, second configuration data of the second volume may be recorded as a destination volume, in the replication relationship, for replication. The proxy (e.g., a virtual proxy volume, a physical proxy volume, or other storage appearing to be natively compatible with the replication relationship) may be recorded as a source volume, in the replication relationship, for replication. In this way, replication source workflow may be implemented upon the proxy (e.g., because the proxy appears to be natively compatible with the replication relationship), which may locally execute certain tasks of the replication source workflow (e.g., control operations not natively supported by the first storage endpoint) or may route certain tasks to the first volume (e.g., file system access operations that relate to actual data stored within the first volume). At 508, the replication source workflow is implemented, at the second storage endpoint, upon the proxy.

At 510, data sending workflow may be implemented to replicate data from the first storage of the first storage endpoint to the second storage of the second storage endpoint. For example, a difference between two snapshots of the first storage may be identified as delta data. The data sending workflow may replicate delta data to the second storage endpoint to apply to the second storage. In this way, cross-platform replication may be implemented where not all storage endpoints natively support snapshot replication or other types of replication.

Figure 6A:
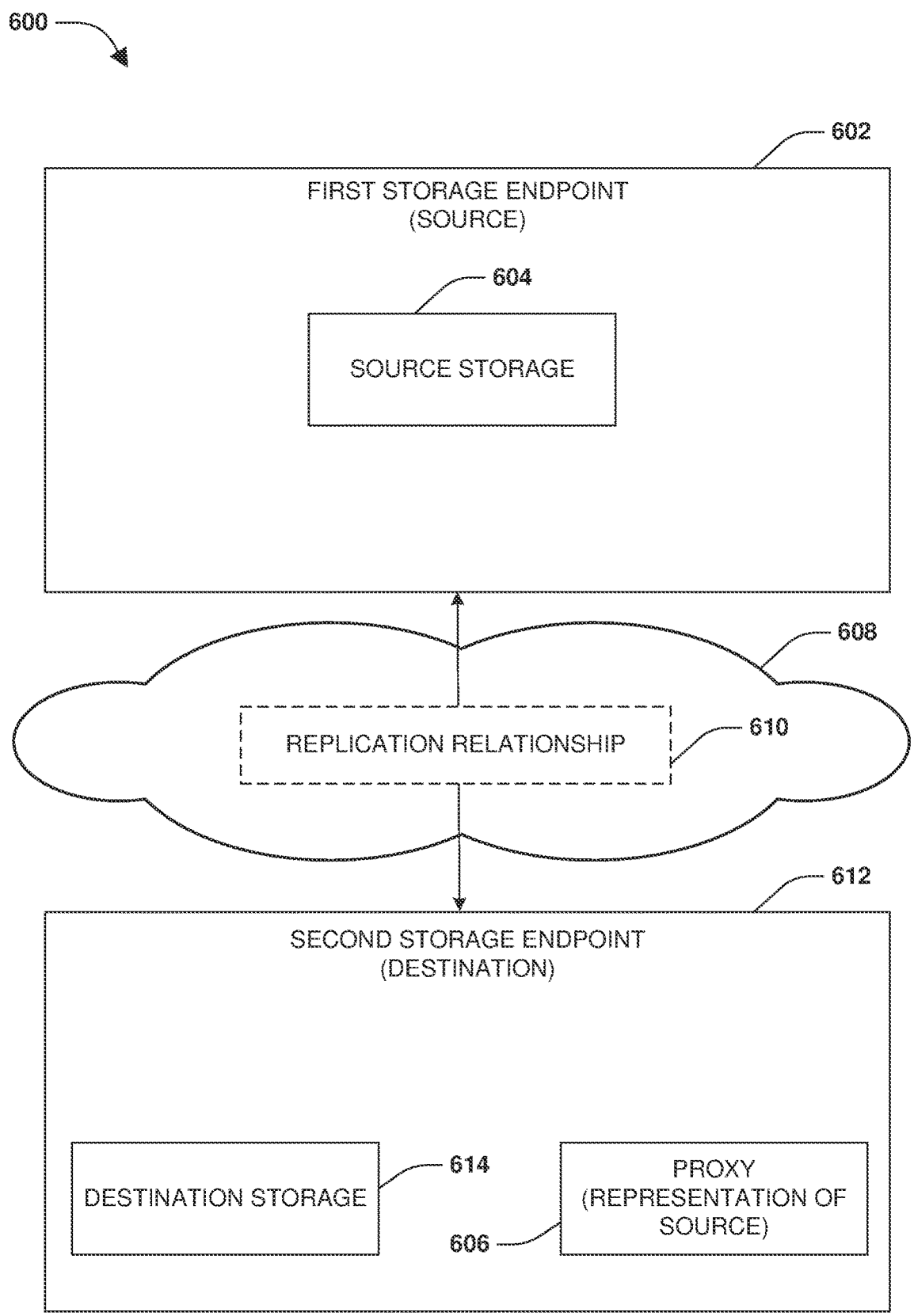
FIG. 6A is a component block diagram illustrating an exemplary computing device for cross-platform replication, where a proxy is implemented at a second storage endpoint.

FIGS. 6A-6D illustrate examples of a system 600 for cross-platform replication. FIG. 6A illustrates a first storage endpoint 602 having communication capabilities with a second storage endpoint 612 over a network 608. A replication relationship 610 may be established between the first storage endpoint 602 as a replication source and the second storage endpoint 612 as a replication destination. For example, the replication relationship 610 may specify that data of source storage 604 of the first storage endpoint 602 (e.g., a LUN, a file, a consistency group of LUNs or files, a volume, a directory, etc.) is to be replicated to destination storage 614 of the second storage endpoint 612. In an example, the second storage endpoint 612 may have a second storage platform that can perform and/or manage replication. However, the first storage endpoint 602 may have a first storage platform that cannot fully perform and/or manage snapshot replication (e.g., in the same manner as the second storage platform). Accordingly, a proxy 606 may be implemented at the second storage endpoint 612 to represent the source storage 604 of the first storage endpoint 602. For example, the proxy 606 may be a virtual or physical proxy volume that is compatible with the replication provided by the second storage endpoint 612, but is configured to appear to be source storage of the replication.

Figure 6B:
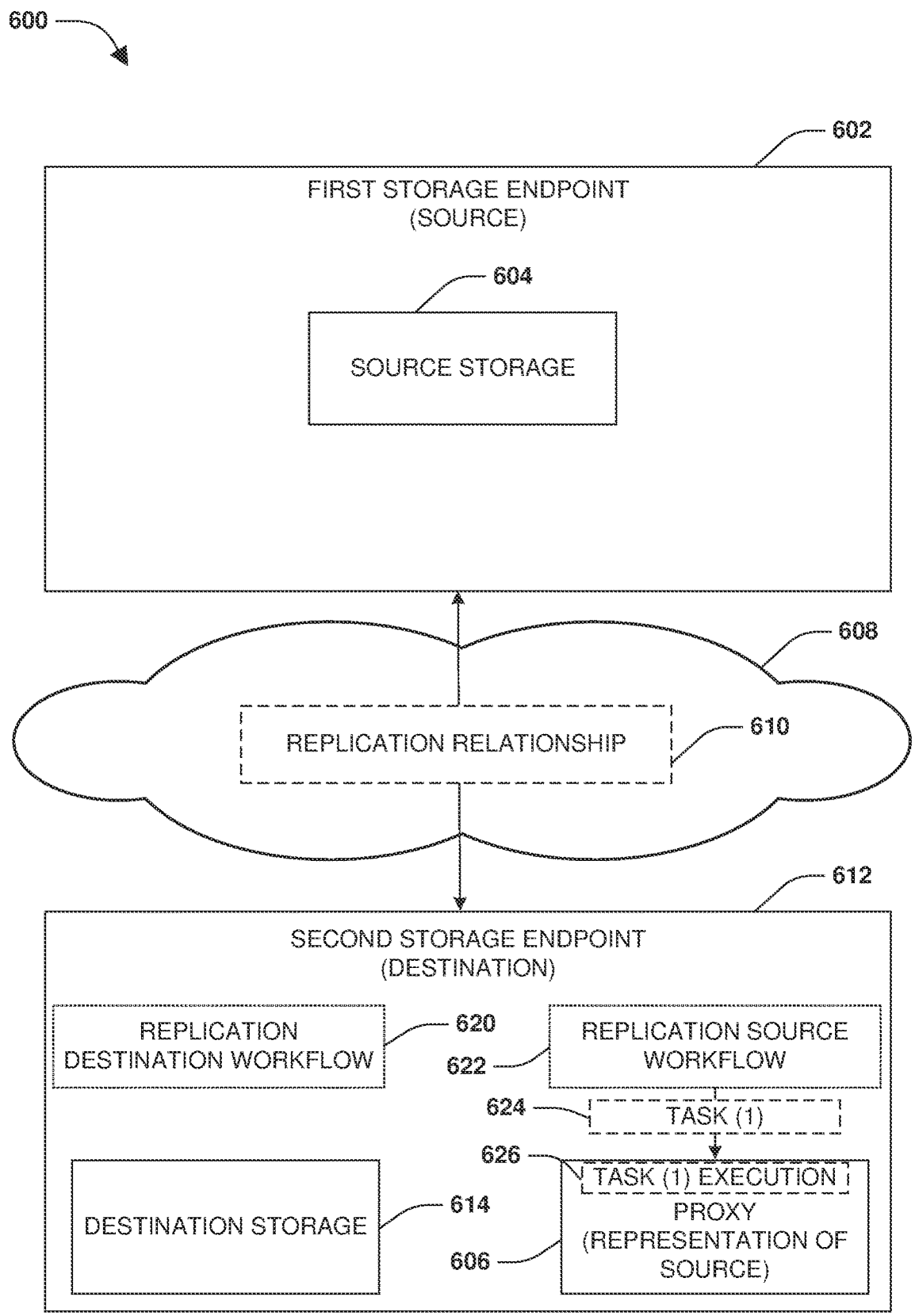
FIG. 6B is a component block diagram illustrating an exemplary computing device for cross-platform replication, where replication source workflow and replication destination workflow are implemented at a second storage endpoint.

FIG. 6B illustrates the second storage endpoint 612 implementing replication destination workflow 620 to perform operations that the replication destination is to execute in order to perform and/or manage replication. The second storage endpoint 612 may implement replication source workflow 622 to perform operations that the replication source is to execute in order to perform and/or manage replication (e.g., in place of the first storage endpoint 602 implementing the replication source workflow 622 because the first storage endpoint 602 may not comprise functionality to adequately perform and/or manage replication with the second storage endpoint 612, thus allowing the first storage endpoint 602 to be a lightweight endpoint). In an example, the replication source workflow 622 may execute 626 a first task 624, having a first task type, against the proxy 606 (e.g., a create stream task may be fully implemented by the proxy 606 without being routed to the first storage endpoint 602, management of a replication state machine, etc.). The first task type may correspond to control operations that can be locally executed by the proxy 606 without accessing data stored within the source storage 604.

Figure 6C:
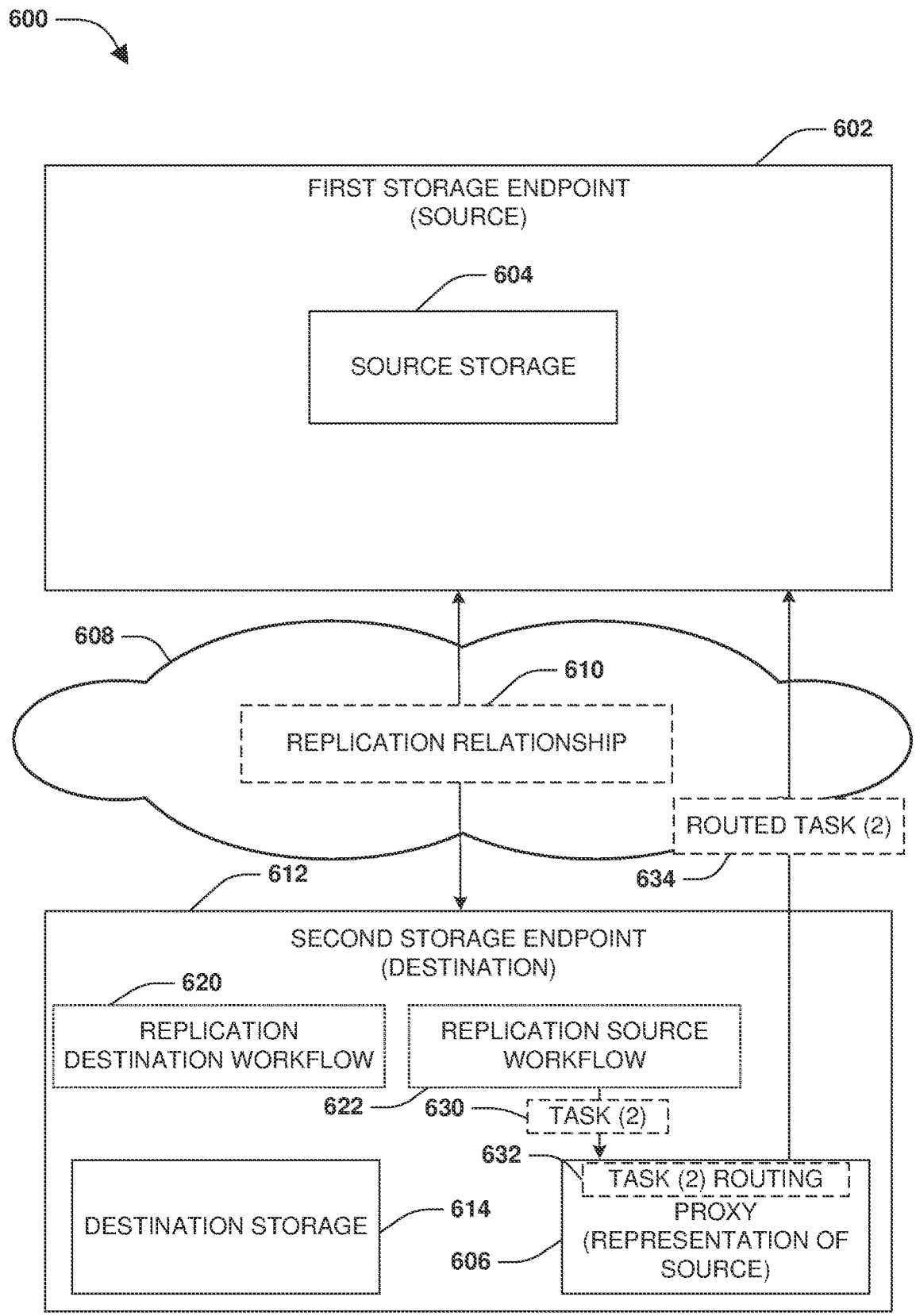
FIG. 6C is a component block diagram illustrating an exemplary computing device for cross-platform replication, where replication source workflow and replication destination workflow are implemented at a second storage endpoint.
Figure 6D:
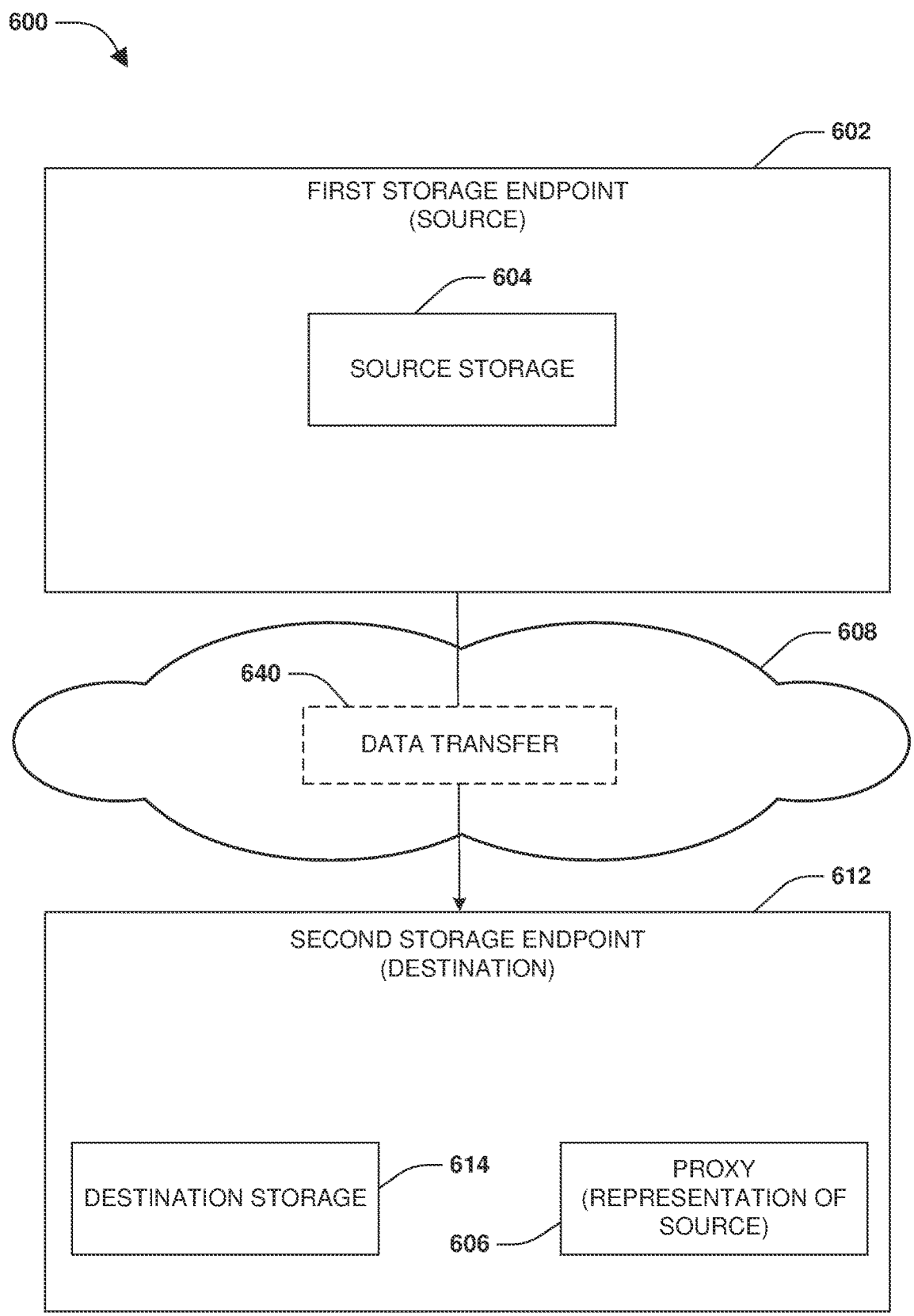
FIG. 6D is a component block diagram illustrating an exemplary computing device for cross-platform replication, where data transfer is performed between a first storage endpoint and a second storage endpoint.

FIG. 6C illustrates the replication source workflow 622 implementing a second task 630 upon the proxy 606, which is routed 632 by the proxy 606 to the first storage endpoint 602 as a routed second task 634. The proxy 606 may route 632 the second task 630 because the second task 630 may correspond to data within the source storage 604 (e.g., the second task 630 may have a second task type that uses data from the source storage 604). For example, the second task 630 may comprise a file system access operation. In this way, the proxy 606 either executes tasks or routes tasks to the first storage endpoint 602 for execution. FIG. 6D illustrates the first storage endpoint 602 performing a data transfer 640 from the source storage 604 to the destination storage 614. For example, the data transfer 640 may send a delta of the source storage 604 between a current snapshot of the source storage 604 and a last snapshot of the source storage 604 used for a last data transfer. In this way, a replication operation may be performed to replicate data of the source storage 604 to the destination storage 614.

Figure 7:
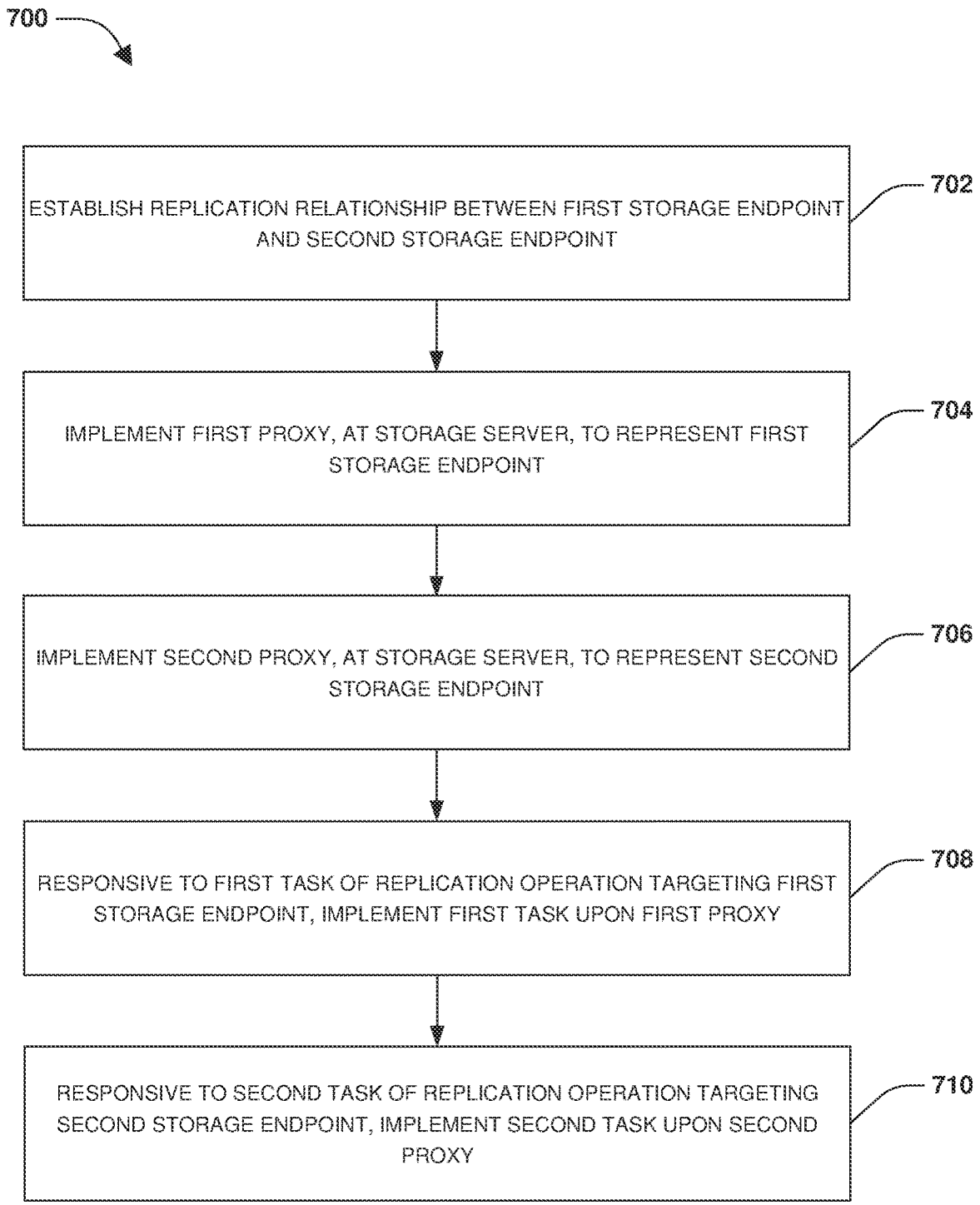
FIG. 7 is a flow chart illustrating an exemplary method of cross-platform replication.

One embodiment of cross-platform replication is illustrated by an exemplary method 700 of FIG. 7. At 702, a replication relationship may be established between a first storage endpoint (e.g., a first storage controller hosting first storage that is used as a replication source for replication) and a second storage endpoint (e.g., a second storage controller hosting second storage that is used as a replication destination for the replication), such as by a storage server.

The first storage endpoint and the second storage endpoint may be different storage platforms, such as a disk based storage platform, a flash array storage platform, a volume based storage platform, a consistency group of files and/or LUNs storage platform, a distributed storage platform such as cloud storage, etc., which may store data differently, use different extent sizes, have different compression characteristics, support different types of storage operations and syntax, have different interfaces, provide different user interfaces for administrators, etc. In an example, the first storage endpoint and the second storage endpoint may not have the ability to perform and/or manage replication or may perform and/or manage snapshot replication in non-compatible ways. However, the storage server may support performing and managing replication.

Accordingly, a first proxy, representing the first storage endpoint (e.g., representing source storage of the first storage endpoint), may be implemented at the storage server, at 704. The first proxy may be implemented at the storage server because the first storage endpoint may not comprise functionality capable of performing replication source workflow. The first proxy (e.g., a virtual proxy volume, a physical proxy volume, or other storage appearing to be natively compatible with the replication relationship) may be recorded as a source volume, in the replication relationship, for replication. In this way, replication source workflow may be implemented upon the first proxy (e.g., because the first proxy appears to be natively compatible with the replication relationship), which may locally execute certain tasks of the replication source workflow (e.g., control operations not natively supported by the first storage endpoint) or may route certain tasks to first storage of the first storage endpoint that comprises the data for replication (e.g., file system access operations that relate to actual data stored within the first storage).

A second proxy, representing the second storage endpoint (e.g., representing destination storage of the second storage endpoint), may be implemented at the storage server, at 706. The second proxy may be implemented at the storage server because the second storage endpoint may not comprise functionality capable of performing replication destination workflow. The second proxy (e.g., a virtual proxy volume, a physical proxy volume, or other storage appearing to be natively compatible with the replication relationship) may be recorded as a destination volume, in the replication relationship, for replication. In this way, replication destination workflow may be implemented upon the second proxy (e.g., because the second proxy appears to be natively compatible with the replication relationship), which may locally execute certain tasks of the replication destination workflow (e.g., control operations not natively supported by the second storage endpoint) or may route certain tasks to second storage of the second storage endpoint into which replicated data is to be stored (e.g., file system access operations that relate to actual data stored within the second storage).

A replication operation, to replicate data from the first storage endpoint (e.g., from the first storage) to the second storage endpoint (e.g., into the second storage) may be performed based upon the replication relationship. The replication operation may comprise one or more tasks associated with the replication source workflow and/or the replication destination workflow. At 708, responsive to a first task of the replication operation targeting the first storage endpoint (e.g., a task of the replication source workflow), the first task may be implemented upon the first proxy. In this way, the first proxy may either locally execute the first task or route the first task to the first storage endpoint for execution upon the first storage. At 710, responsive to a second task of the replication operation targeting the second storage endpoint (e.g., a task of the replication destination workflow), the second task may be implemented upon the second proxy. In this way, the second proxy may either locally execute the second task or route the second task to the second storage endpoint for execution upon the second storage. In this way, the replication operation may be performed and managed by the storage server.

Figure 8A:
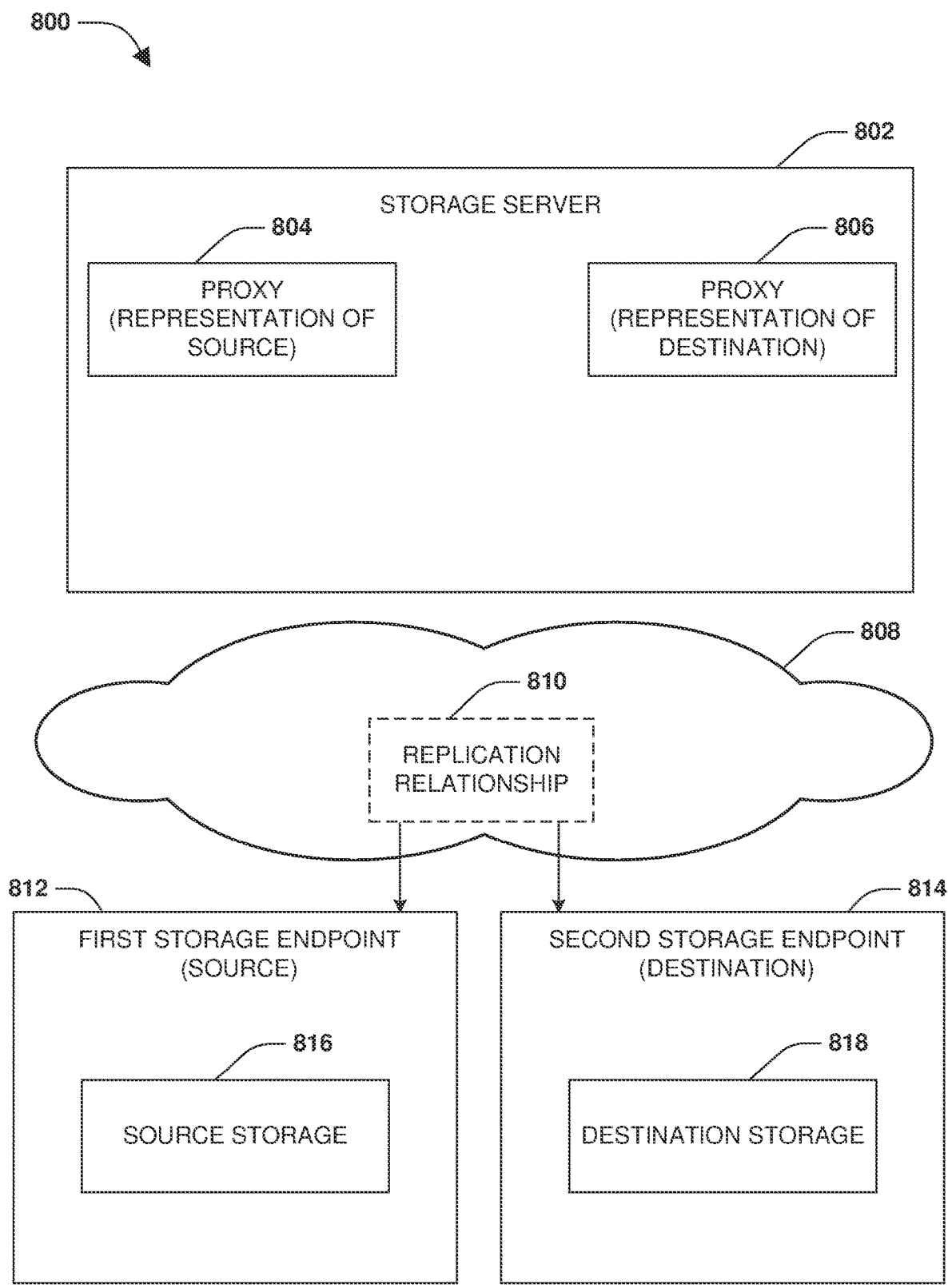
FIG. 8A is a component block diagram illustrating an exemplary computing device for cross-platform replication, where a proxy is implemented at a storage server.

FIGS. 8A-8D illustrate examples of a system 800 for cross-platform replication. FIG. 8A illustrates a storage server 802, a first storage endpoint 812, and a second storage endpoint 814 having communication capabilities over a network 808. A replication relationship 810 may be established between the first storage endpoint 812 as a replication source and the second storage endpoint 814 as a replication destination. For example, the replication relationship 810 may specify that data of source storage 816 of the first storage endpoint 812 (e.g., a LUN, a file, a consistency group of LUNs or files, a volume, a directory, etc.) is to be replicated to destination storage 818 of the second storage endpoint 814, such as by performing baseline and/or incremental transfers using snapshots.

The first storage endpoint 812 and the second storage endpoint 814 may be different storage platforms, such as a disk based storage platform, a flash array storage platform, a volume based storage platform, a consistency group of files and/or LUNs storage platform, a distributed storage platform such as cloud storage, etc., which may store data differently, use different extent sizes, have different compression characteristics, support different types of storage operations and syntax, have different interfaces, provide different user interfaces for administrators, etc. In an example, the first storage endpoint 812 and the second storage endpoint 814 may not have the ability to perform and/or manage snapshot replication or may perform and/or manage snapshot replication in non-compatible ways. However, the storage server 802 may support performing and managing snapshot replication.

Accordingly, a first proxy 804, representing the first storage endpoint 812 (e.g., representing the source storage 816), may be implemented at the storage server 802. The first proxy may 804 be implemented at the storage server 802 because the first storage endpoint 812 may not comprise functionality capable of performing replication source workflow. The first proxy 804 (e.g., a virtual proxy volume, a physical proxy volume, or other storage appearing to be natively compatible with the replication relationship 810) may be recorded as a source volume, in the replication relationship 810, for replication. In this way, replication source workflow may be implemented upon the first proxy 804 (e.g., because the first proxy 804 appears to be natively compatible with the replication relationship 810), which may locally execute certain tasks of the replication source workflow (e.g., control operations not natively supported by the first storage endpoint 812) or may route certain tasks to the source storage 816 of the first storage endpoint 812 that comprises the data for replication (e.g., file system access operations that relate to actual data stored within the source storage 816).

A second proxy 806, representing the second storage endpoint 814 (e.g., representing the destination storage 818), may be implemented at the storage server 802. The second proxy 806 may be implemented at the storage server 802 because the second storage endpoint 814 may not comprise functionality capable of performing replication destination workflow. The second proxy 806 (e.g., a virtual proxy volume, a physical proxy volume, or other storage appearing to be natively compatible with the replication relationship 810) may be recorded as a destination volume, in the replication relationship 810, for replication. In this way, replication destination workflow may be implemented upon the second proxy 806 (e.g., because the second proxy 806 appears to be natively compatible with the replication relationship 810), which may locally execute certain tasks of the replication destination workflow (e.g., control operations not natively supported by the second storage endpoint 814) or may route certain tasks to the destination storage 818 into which replicated data is to be stored (e.g., file system access operations that relate to actual data stored within the destination storage 818).

Figure 8B:
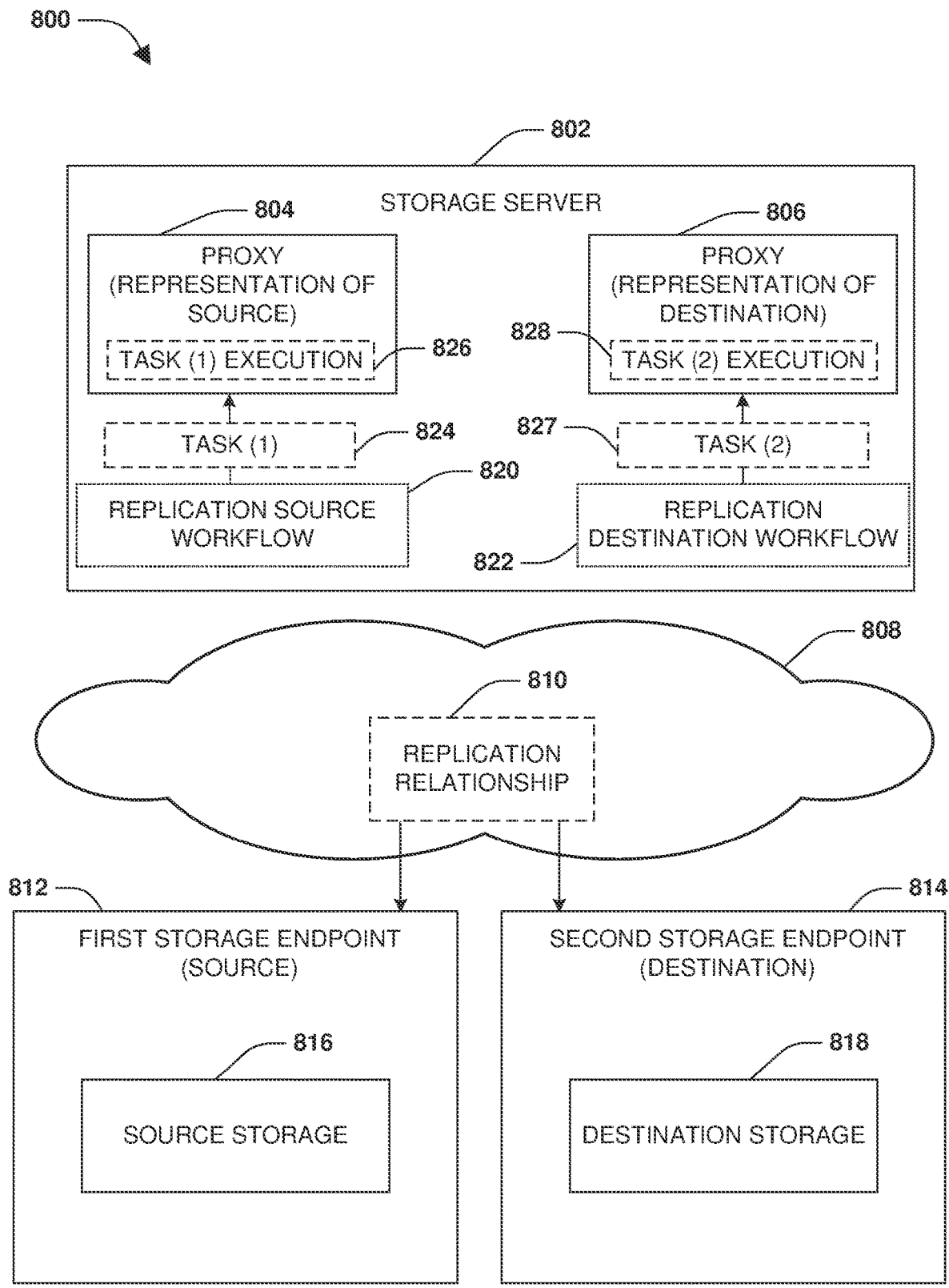
FIG. 8B is a component block diagram illustrating an exemplary computing device for cross-platform replication, where replication source workflow and replication destination workflow are implemented at a storage server.

FIG. 8B illustrates the storage server 802 implementing replication source workflow 820 to perform operations that the replication source is to execute in order to perform and/or manage replication and implementing replication destination workflow 822 to perform operations that the replication destination is to execute in order to perform and/or manage replication. In an example, the replication source workflow 820 may execute 826 a first task 824, having a first task type, against the first proxy 804. The replication destination workflow 822 may execute 828 a second task 827, having the first task type, against the second proxy 806. The first task type may correspond to tasks that may be executed by proxies without accessing actual data of the source storage 816 or destination storage 818.

Figure 8C:
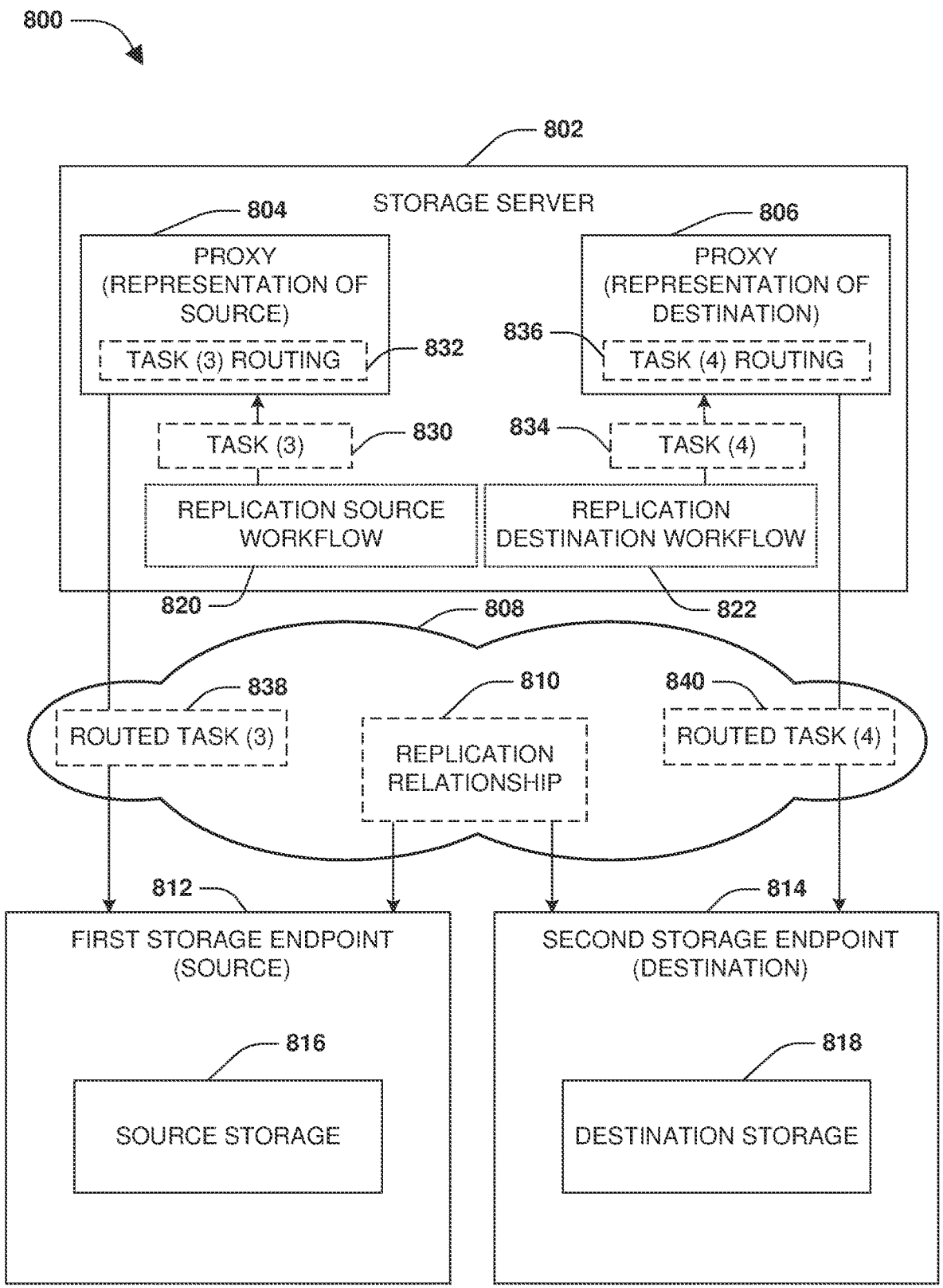
FIG. 8C is a component block diagram illustrating an exemplary computing device for cross-platform replication, where replication source workflow and replication destination workflow are implemented at a storage server.

FIG. 8C illustrates the replication source workflow 820 implementing a third task 830 upon the first proxy 804, which is routed 832 by the first proxy 804 to the first storage endpoint 812 as a routed third task 838. The first proxy 804 may route 832 the third task 830 because the third task 830 may correspond to data within the source storage 816. The replication destination workflow 822 may implement a fourth task 834 upon the second proxy 806, which is routed 836 by the second proxy 806 to the second storage endpoint 814 as a routed fourth task 840. The second proxy 806 may route 836 the fourth task 834 because the fourth task 834 may correspond to data within the destination storage 818.

Figure 8D:
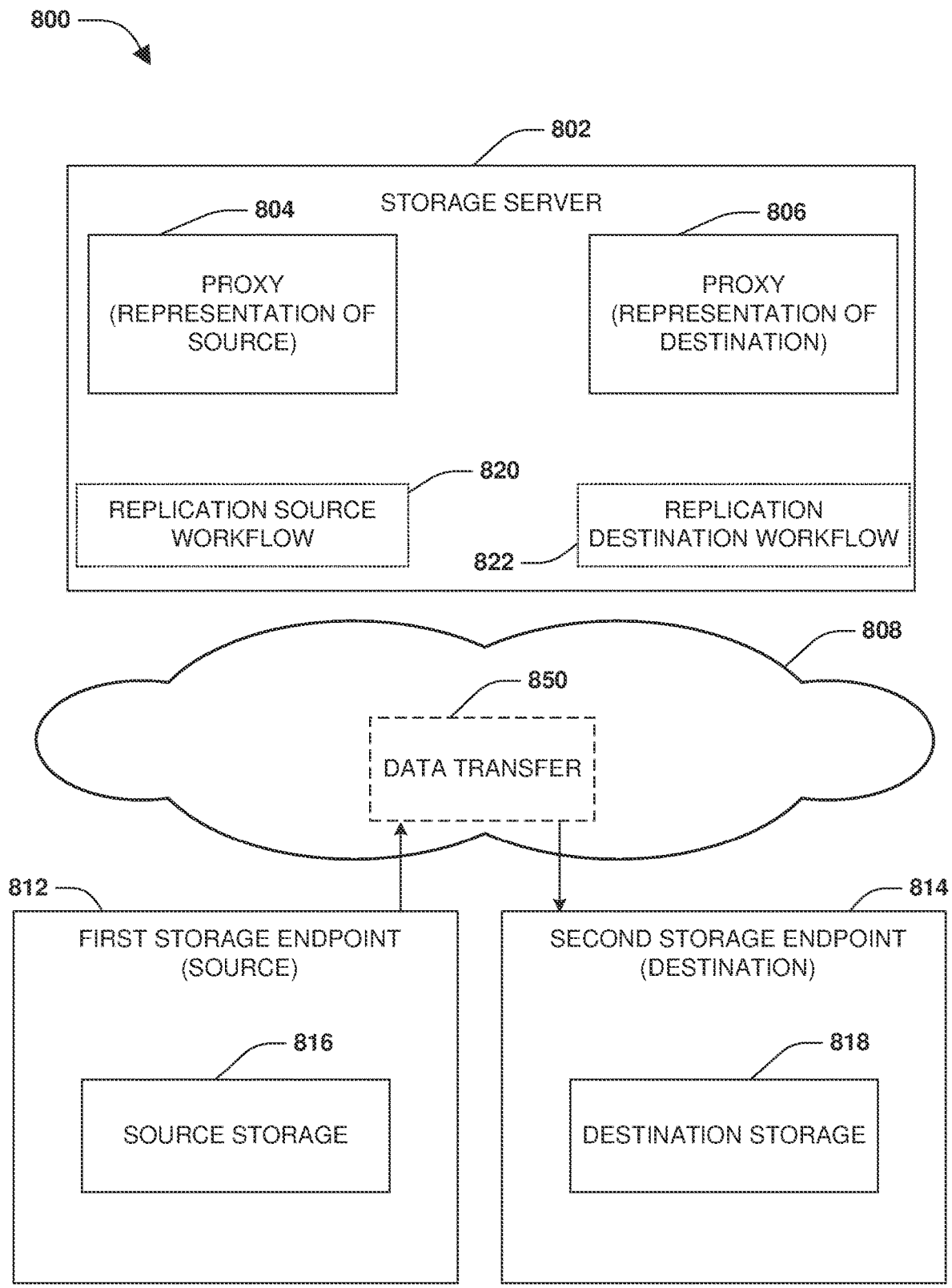
FIG. 8D is a component block diagram illustrating an exemplary computing device for cross-platform replication, where data transfer is performed between a first storage endpoint and a second storage endpoint.

FIG. 8D illustrates the first storage endpoint 812 performing a data transfer 850 from the source storage 816 to the destination storage 818. For example, the data transfer 850 may send a delta of the source storage 816 between a current snapshot of the source storage 816 and a last snapshot of the source storage 816 used for a last data transfer. In this way, a replication operation may be performed to replicate data of the source storage 816 to the destination storage 818.

Figure 9:
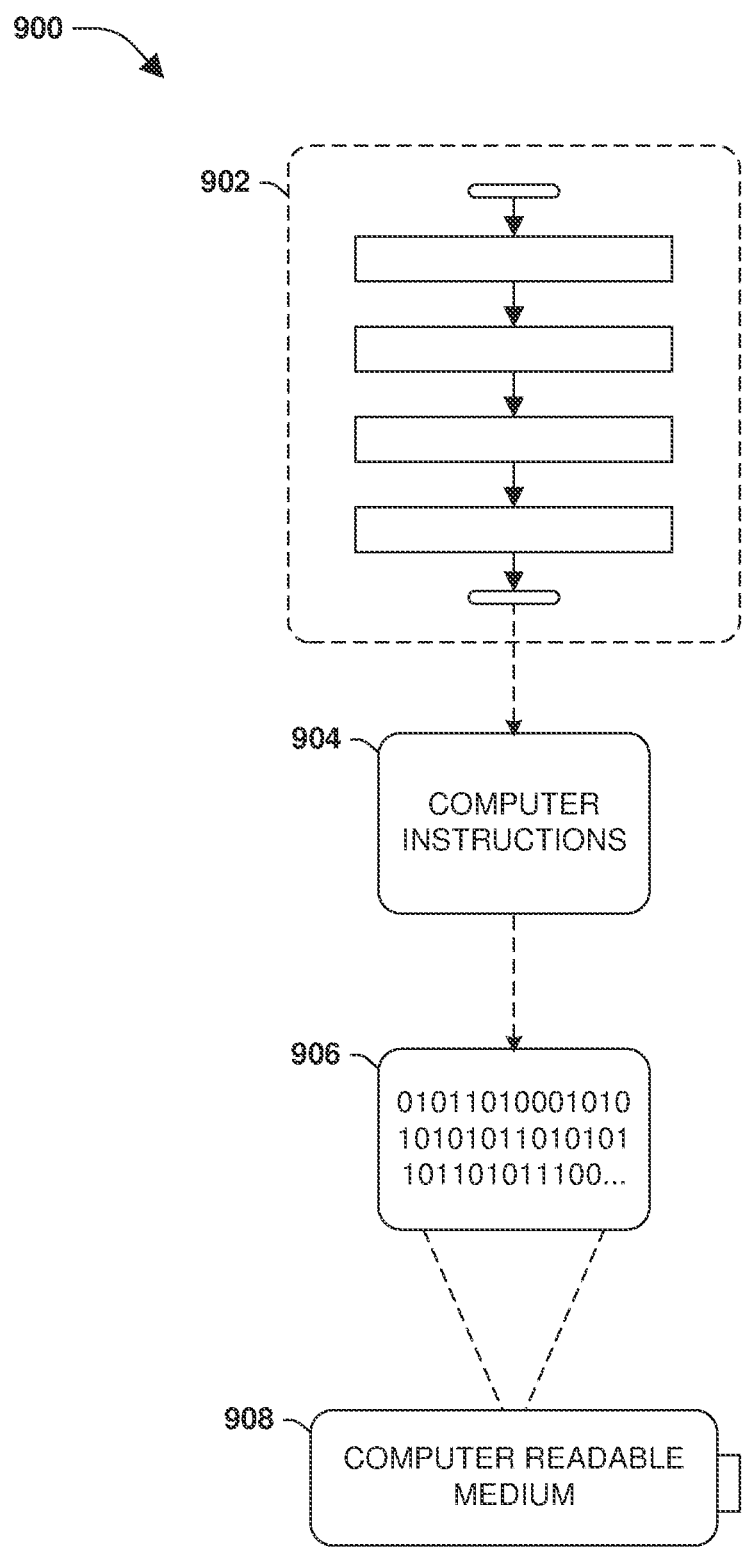
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises a processor-executable computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 500 of FIG. 5, and/or at least some of the exemplary method 700 of FIG. 7, for example. In some embodiments, the processor-executable computer instructions 904 are configured to implement a system, such as at least some of the exemplary system 400 of FIGS. 4A-4D, at least some of the exemplary system 600 of FIGS. 6A-6D, and/or at least some of the exemplary system 800 of FIGS. 8A-8D for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   establishing a replication relationship between a first storage platform and a second storage platform different than the first storage platform;
   implementing a first proxy to represent the first storage platform;
   implementing a second proxy to represent the second storage platform;
   hosting the first proxy and the second proxy at the first storage platform to execute a replication source workflow at the first storage platform as a replication source and to execute a replication destination workflow, at the first storage platform, on behalf of the second storage platform as a replication destination; and
   performing a replication operation to replicate data from the first storage platform to the second storage platform based upon the replication relationship, wherein the performing comprises:
   responsive to a first task of the replication operation targeting the first storage platform, implementing the first task upon the first proxy; and
   responsive to a second task of the replication operation targeting the second storage platform, implementing the second task upon the second proxy.

2. The method of claim 1, wherein the first storage platform hosts a first storage controller having a different storage controller version or model than a second storage controller hosted by the second storage platform.

3. The method of claim 1, wherein the first storage platform uses a different extent size than the second storage platform.

4. The method of claim 1, wherein the first storage platform uses different compression characteristics than the second storage platform.

5. The method of claim 1, wherein the first storage platform supports different storage operations and syntax than storage operations and syntax supported by the second storage platform.

6. The method of claim 1, wherein the first storage platform supports different data and control interface than data and control interface supported by the second storage platform.

7. The method of claim 1, wherein the first storage platform is a disk based storage platform and the second storage platform is a cloud storage platform.

8. The method of claim 1, wherein the first storage platform is a volume based storage platform and the second storage platform is a cloud storage platform.

9. The method of claim 1, wherein the first storage platform lacks the ability to perform and manage replication with the second storage platform.

10. The method of claim 1, wherein the first storage platform lacks functionality to fully implemented control operations associated with replication supported by the second storage platform.

11. A non-transitory machine readable medium having stored thereon instructions which when executed by a machine, causes the machine to perform operations comprising:
    establishing a replication relationship between a first storage platform and a second storage platform different than the first storage platform;
    implementing a first proxy to represent the first storage platform;
    implementing a second proxy to represent the second storage platform;
    hosting the first proxy and the second proxy at the first storage platform to execute a replication source workflow at the first storage platform as a replication source and to execute a replication destination workflow, at the first storage platform, on behalf of the second storage platform as a replication destination; and
    performing a replication operation to replicate data from the first storage platform to the second storage platform based upon the replication relationship, wherein the performing comprises:
    responsive to a first task of the replication operation targeting the first storage platform, implementing the first task upon the first proxy; and
    responsive to a second task of the replication operation targeting the second storage platform, implementing the second task upon the second proxy.

12. The non-transitory machine readable medium of claim 11, wherein the first storage platform hosts a first storage controller having a different storage controller version or of model than a second storage controller hosted by the second storage platform.

13. The non-transitory machine readable medium of claim 11, wherein the first storage platform uses a different extent size than the second storage platform.

14. The non-transitory machine readable medium of claim 11, wherein the first storage platform uses different compression characteristics than the second storage platform.

15. The non-transitory machine readable medium of claim 11, wherein the first storage platform supports different storage operations and syntax than storage operations and syntax supported by the second storage platform.

16. The non-transitory machine readable medium of claim 11, wherein the first storage platform supports different data and control interface than data and control interface supported by the second storage platform.

17. A computing device comprising:
a memory storing machine executable code; and
a processor coupled to the memory, the processor configured to execute the machine executable code to cause the processor to perform operations comprising:
establishing a replication relationship between a first storage platform and a second storage platform different than the first storage platform;
implementing a first proxy to represent the first storage platform;
implementing a second proxy to represent the second storage platform;
hosting the first proxy and the second proxy at the first storage platform to execute a replication source workflow at the first storage platform as a replication source and to execute a replication destination workflow, at the first storage platform, on behalf of the second storage platform as a replication destination; and
performing a replication operation to replicate data from the first storage platform to the second storage platform based upon the replication relationship, wherein the performing comprises:
responsive to a first task of the replication operation targeting the first storage platform, implementing the first task upon the first proxy; and
responsive to a second task of the replication operation targeting the second storage platform, implementing the second task upon the second proxy.

18. The computing device of claim 17, wherein the first storage platform hosts a first storage controller having a different storage controller version or model than a second storage controller hosted by the second storage platform.

19. The computing device of claim 17, wherein the first storage platform uses a different extent size than the second storage platform.

20. The computing device of claim 17, wherein the first storage platform uses different compression characteristics than the second storage platform.

* * * * *